United States Patent
Nakagawa

(10) Patent No.: US 11,773,789 B2
(45) Date of Patent: Oct. 3, 2023

(54) FLOW VOLUME RATIO CALCULATION DEVICE, CONTROL DEVICE EQUIPPED WITH SAME, GAS TURBINE PLANT EQUIPPED WITH THIS CONTROL DEVICE, FLOW VOLUME RATIO CALCULATION METHOD, AND FUEL LINE CONTROL METHOD

(71) Applicant: MITSUBISHI HITACHI POWER SYSTEMS, LTD., Kanagawa (JP)

(72) Inventor: Jotaro Nakagawa, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 795 days.

(21) Appl. No.: 15/321,459

(22) PCT Filed: Jul. 17, 2015

(86) PCT No.: PCT/JP2015/070502
§ 371 (c)(1),
(2) Date: Jun. 6, 2017

(87) PCT Pub. No.: WO2016/021390
PCT Pub. Date: Feb. 11, 2016

(65) Prior Publication Data
US 2017/0292458 A1  Oct. 12, 2017

(30) Foreign Application Priority Data
Aug. 6, 2014  (JP) .................................. 2014-160606

(51) Int. Cl.
*F02C 9/34*  (2006.01)
*F02C 7/228*  (2006.01)
(Continued)

(52) U.S. Cl.
CPC ................ *F02C 9/34* (2013.01); *F02C 7/228* (2013.01); *F02C 9/26* (2013.01); *F02C 9/28* (2013.01);
(Continued)

(58) Field of Classification Search
CPC ...... F02C 9/34; F02C 9/26; F02C 9/28; F02C 7/228; F02C 9/32; F02C 9/20; F02C 9/54;
(Continued)

(56) References Cited

U.S. PATENT DOCUMENTS

2007/0079593 A1*  4/2007  Fujii ..................... F02C 7/1435
                                                   60/39.27
2013/0227954 A1*  9/2013  Marini ..................... F02C 9/54
                                                   60/773

FOREIGN PATENT DOCUMENTS

JP  2004-108315  4/2004
JP  2007-77866   3/2007
(Continued)

OTHER PUBLICATIONS

International Search Report dated Sep. 8, 2015 in corresponding (PCT) International Application No. PCT/JP2015/070502 (with English translation).
(Continued)

*Primary Examiner* — Arun Goyal
*Assistant Examiner* — William L Breazeal
(74) *Attorney, Agent, or Firm* — Wenderoth, Lind & Ponack, L.L.P.

(57) ABSTRACT

A gas turbine includes: multiple fuel systems; a combustor that combusts fuels from the multiple fuel systems in compressed air to generate combustion gas; and a turbine that is driven by the combustion gas. A flow volume ratio calculation device which calculates the flow volume ratio of
(Continued)

the fuels flowing in the multiple fuel systems includes calculators that receive values of a first parameter and a second parameter capable of expressing the combustion state in the combustor, and that calculate the flow volume ratio relative to the received values of the two parameters from a predetermined relationship between the two parameters and the flow volume ratio.

8 Claims, 18 Drawing Sheets

(51) Int. Cl.
    *F23R 3/34*     (2006.01)
    *F02C 9/26*     (2006.01)
    *F02C 9/28*     (2006.01)
    *F02C 9/32*     (2006.01)

(52) U.S. Cl.
    CPC ............ *F23R 3/34* (2013.01); *F02C 9/32* (2013.01); *F05D 2270/303* (2013.01); *F05D 2270/306* (2013.01)

(58) Field of Classification Search
    CPC . F23R 3/34; F05D 2270/303; F05D 2270/306
    See application file for complete search history.

(56) References Cited

FOREIGN PATENT DOCUMENTS

| JP | 2007-77867 | 3/2007 |
|---|---|---|
| JP | 2010-127242 | 6/2010 |
| JP | 2012-77662 | 4/2012 |
| JP | 2013-96303 | 5/2013 |

OTHER PUBLICATIONS

Written Opinion of the International Searching Authority dated Sep. 8, 2015 in corresponding (PCT) International Application No. PCT/JP2015/070502 (with English translation).

\* cited by examiner

FLOW VOLUME RATIO CALCULATION DEVICE, CONTROL DEVICE EQUIPPED WITH SAME, GAS TURBINE PLANT EQUIPPED WITH THIS CONTROL DEVICE, FLOW VOLUME RATIO CALCULATION METHOD, AND FUEL LINE CONTROL METHOD

TECHNICAL FIELD

The present invention relates to technology for calculating a flow volume ratio of fuels supplied to a combustor from multiple fuel systems.

This application claims priority based on Japanese Patent Application No. 2014-160606, filed in Japan on Aug. 6, 2014, the contents of which are incorporated herein by reference.

BACKGROUND ART

A gas turbine includes a compressor that compresses air, a combustor that combusts fuel in the air compressed by the compressor to generate combustion gas, and a turbine that is driven by the combustion gas. Some combustors include a pilot burner that subjects a fuel to diffusion combustion, and a main burner that subjects a fuel to premixed combustion. With such a combustor, it is necessary to manage the flow volume ratio of the fuels supplied to the respective burners, for example, to enhance the combustion stability of the fuels.

For example, according to the technology disclosed in Patent Document 1 listed below, a flow volume ratio of fuels supplied to the respective burners is set in accordance with a value indicated by a combustion load command obtained by nondimensionalizing the temperature of an inlet of a turbine into which combustion gas from the combustor flows.

Citation List

Patent Document

Patent Document 1: Japanese Unexamined Patent Application Publication No. 2007-077867A

SUMMARY OF THE INVENTION

Technical Problem

In recent years, restrictions on exhaust gases from gas turbines are becoming stricter, which forces fuel to be combusted in combustors under stricter conditions. This requires technology for combusting fuel stably even under conditions not favorable for combustion.

In light of the foregoing, an object of the present invention is to provide technology capable of enhancing combustion stability in a combustor.

Solution to Problem

To achieve the above-described object, a flow volume ratio calculation device according to an aspect of the invention is a flow volume ratio calculation device provided in a gas turbine including multiple fuel systems, a compressor that compresses air to generate compressed air, a combustor that combusts fuels from the multiple fuel systems in the compressed air to generate combustion gas, and a turbine that is driven by the combustion gas. The flow volume ratio calculation device that calculates a flow volume ratio of the fuels flowing in the multiple fuel systems includes a calculator that receives values of two parameters capable of expressing a combustion state in the combustor and calculates the flow volume ratio relative to the received values of the two parameters from a predetermined relationship between the two parameters and the flow volume ratio.

The combustion state in the combustor can be expressed by two parameters. According to this flow volume ratio calculation device, the values of the two parameters capable of expressing the combustion state are received, and a flow volume ratio in accordance with these values is determined. Thus, according to this flow volume ratio calculation device, the combustion state can be understood more accurately than when determining the flow volume ratio in accordance with a combustion state determined only from a combustion load command value, and a flow volume ratio in accordance with this combustion state can be determined. Note that the combustion load command value is a value obtained by nondimensionalizing the inlet temperature of the turbine into which the combustion gas from the combustor flows. Thus, according to the flow volume ratio calculation device, the combustion stability of the fuel can be further improved by setting the flow volume ratio of the fuels flowing in the multiple fuel systems to the flow volume ratio calculated by the flow volume ratio calculation device.

Here, in the flow volume ratio calculation device according to the above-described aspect, of the two parameters received by the calculator, a first parameter may be an inlet temperature-correlated value that is a value that changes in correlation with a change in an inlet temperature of the combustion gas in the turbine or that is the inlet temperature itself, and a second parameter may be a flow velocity-correlated value that changes in correlation with a change in a flow velocity of the combustion gas within the combustor.

In this case, the flow velocity-correlated value may be one of an output of the gas turbine, a load factor that is a percentage of a current load relative to a maximum load permitted in the gas turbine, a total flow volume of the fuels supplied to the combustor from the multiple fuel systems, and a flow volume of the air taken in by the compressor.

Additionally, in the flow volume ratio calculation device according to the above-described aspect, of the two parameters received by the calculator, a first parameter may be a total flow volume of the fuels supplied to the combustor from the multiple fuel systems, and a second parameter may be a flow volume of the air taken in by the compressor.

Additionally, in any one of the flow volume ratio calculation devices described above, the calculator may include: a flow volume ratio computer that determines the flow volume ratio relative to the received value of the first parameter from a predetermined relationship between the first parameter and the flow volume ratio; a correction value computer that determines a correction value in accordance with the received value of the second parameter from a predetermined relationship between the second parameter and a correction value for the flow volume ratio; and a corrector that corrects the flow volume ratio determined by the flow volume ratio computer with the correction value determined by the correction value computer.

Additionally, in the flow volume ratio calculation device including the correction value computer, the predetermined relationship used by the correction value computer may be a relationship between the second parameter and the flow volume ratio when the first parameter is constant.

Additionally, in any one of the flow volume ratio calculation devices described above, in the case where the combustor includes a first burner that subjects a fuel to diffusion combustion and a second burner that subjects a fuel to premixed combustion, and the gas turbine includes, as the multiple fuel systems, a first fuel system that supplies a fuel to the first burner and a second fuel system that supplies a fuel to the second burner, the flow volume ratio may include a ratio of a flow volume of the fuel supplied to the combustor from the first fuel system to the total flow volume of the fuels supplied to the combustor from the multiple fuel systems.

Additionally, in any one of the flow volume ratio calculation devices described above, in the case where the combustor includes a burner that sprays a fuel, and the gas turbine includes, as the multiple fuel systems, a burner system that supplies a fuel to the burner and an upstream supply system that supplies a fuel into the compressed air delivered to the burner, the flow volume ratio may include a ratio of a flow volume of the fuel supplied to the combustor from the burner system to the total flow volume of the fuels supplied to the combustor from the multiple fuel systems.

To achieve the above-described object, control device according to an aspect of the invention includes: any one of the flow volume ratio calculation devices described above; a total flow volume computer that determines the total flow volume of the fuels supplied to the combustor from the multiple fuel systems; a system flow volume computer that determines a fuel flow volume in each of the multiple fuel systems from the total flow volume determined by the total flow volume computer and the flow volume ratio calculated by the flow volume ratio calculation device; and a valve controller that outputs a control signal to a fuel flow volume adjustment valve provided in each of the multiple fuel systems so that the fuel flow volume in each of the multiple fuel systems becomes the corresponding fuel flow volume determined by the system flow volume computer.

To achieve the above-described object, a gas turbine plant according to an aspect of the invention includes the control device and the gas turbine.

To achieve the above-described object, a flow volume ratio calculation method according to an aspect of the invention is a flow volume ratio calculation method for a gas turbine including multiple fuel systems, a compressor that compresses air to generate compressed air, a combustor that combusts fuels from the multiple fuel systems in the compressed air to generate combustion gas, and a turbine that is driven by the combustion gas. The flow volume ratio calculation method for calculating a flow volume ratio of the fuels flowing in the multiple fuel systems includes: a receiving step of receiving values of two parameters capable of expressing a combustion state in the combustor; and a computing step of determining the flow volume ratio relative to the values of the two parameters received in the receiving step from a predetermined relationship between the two parameters and the flow volume ratio.

Here, in the flow volume ratio calculation method according to the above-described aspect, of the two parameters received in the receiving step, a first parameter may be an inlet temperature-correlated value that is a value that changes in correlation with a change in an inlet temperature of the combustion gas in the turbine or that is the inlet temperature itself, and a second parameter may be a flow velocity-correlated value that changes in correlation with a change in a flow velocity of the combustion gas within the combustor.

In this case, the flow velocity-correlated value may be one of an output of the gas turbine, a load factor that is a percentage of a current load relative to a maximum load permitted in the gas turbine, a total flow volume of the fuels supplied to the combustor from the multiple fuel systems, and a flow volume of the air taken in by the compressor.

Additionally, in the flow volume ratio calculation method according to the above-described aspect, of the two parameters received in the receiving step, a first parameter may be a total flow volume of the fuels supplied to the combustor from the multiple fuel systems, and the second parameter may be a flow volume of the air taken in by the compressor.

Additionally, in any one of the flow volume ratio calculation methods described above, the computing step may include: a flow volume ratio computing step of determining the flow volume ratio relative to the value of the first parameter received in the receiving step from a predetermined relationship between the first parameter and the flow volume ratio; a correction value computing step of determining a correction value in accordance with the value of the second parameter received in the receiving step from a predetermined relationship between the second parameter and a correction value for the flow volume ratio; and a correcting step of correcting the flow volume ratio determined in the flow volume ratio computing step with the correction value determined in the correction value computing step.

In this case, the predetermined relationship used in the correction value computing step may be a relationship between the second parameter and the flow volume ratio when the first parameter is constant.

To achieve the above-described object, a fuel system control method according to an aspect of the invention in which any one of the flow volume ratio calculation methods described above is executed includes: a total flow volume computing step of determining a total flow volume of the fuels supplied to the combustor from the multiple fuel systems; a system flow volume computing step of determining a fuel flow volume in each of the multiple fuel systems from the total flow volume determined in the total flow volume computing step and the flow volume ratio calculated by the flow volume ratio calculation method; and a valve controlling step of outputting a control signal to a fuel flow volume adjustment valve provided in each of the multiple fuel systems so that the fuel flow volume in each of the multiple fuel systems becomes the corresponding fuel flow volume determined in the system flow volume computing step.

Advantageous Effects of Invention

According to an aspect of the present invention, the combustion stability of fuel within a combustor can be improved.

BRIEF DESCRIPTION OF THE DRAWINGS

FIG. 15A is a graph showing a relationship between the load factor % Load and the IGV opening. FIG. 15B is a graph showing a relationship between the load factor % Load and the combustion load command value CLCSO. FIG. 15C is a graph showing a relationship between the combustion load command value CLCSO and the pre-correction pilot ratio ($PL_0$ ratio). FIG. 15D is a graph showing a relationship between the load factor % Load and the pre-correction pilot ratio ($PL_0$ ratio). FIG. 15E is a graph showing a relationship between the load factor % Load and the correction value Cp. FIG. 15F is a graph showing a relationship between the load factor % Load and the post-correction and pre-correction pilot ratios (PL ratio and $PL_0$ ratio, respectively).

DESCRIPTION OF THE EMBODIMENT

Embodiment

Hereinafter, an embodiment of a flow volume ratio calculation device, a control device, and a gas turbine plant including the control device according to the present invention will be described with reference to the drawings.

Figure 1:
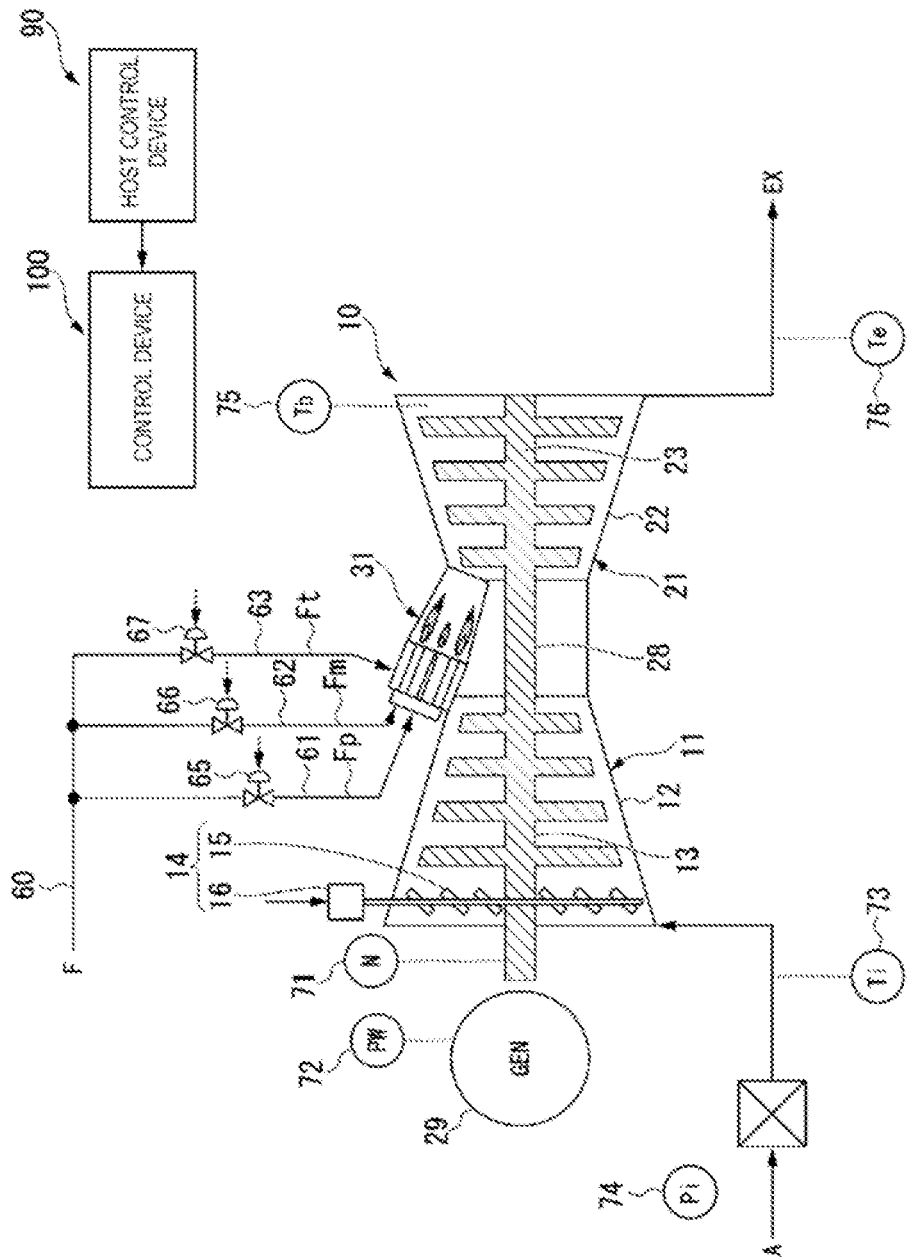
FIG. 1 is a system diagram illustrating a gas turbine plant according to an embodiment of the present invention.

As illustrated in FIG. 1, the gas turbine plant according to the present embodiment includes a gas turbine 10, and a generator 29 that is driven by the gas turbine 10 to generate power. The gas turbine 10 includes a compressor 11 that compresses air, a combustor 31 that combusts a fuel F in the air compressed by the compressor 11 to generate combustion gas, and a turbine 21 that is driven by the high-temperature high-pressure combustion gas.

The compressor 11 includes a compressor rotor 13 that rotates about an axis of the compressor 11, a compressor casing 12 that covers the compressor rotor 13 while allowing the compressor rotor 13 to rotate, and an inlet guide vane (IGV) 14 provided at an intake port of the compressor casing 12. The ICV 14 includes multiple guide vanes 15 and a driver 16 that drives the multiple guide vanes 15. The IGV 14 adjusts a flow volume of the air taken into the compressor casing 12.

The turbine 21 includes a turbine rotor 23 that is rotated about the axis by the combustion gas from the combustor 31, and a turbine casing 22 that covers the turbine rotor 23 while allowing the turbine rotor 23 to rotate. The turbine rotor 23 and the compressor rotor 13 rotate around the same axis, and are connected to each other to form a gas turbine rotor 28. A rotor of the generator 29 is connected to this gas turbine rotor 28.

Figure 2:
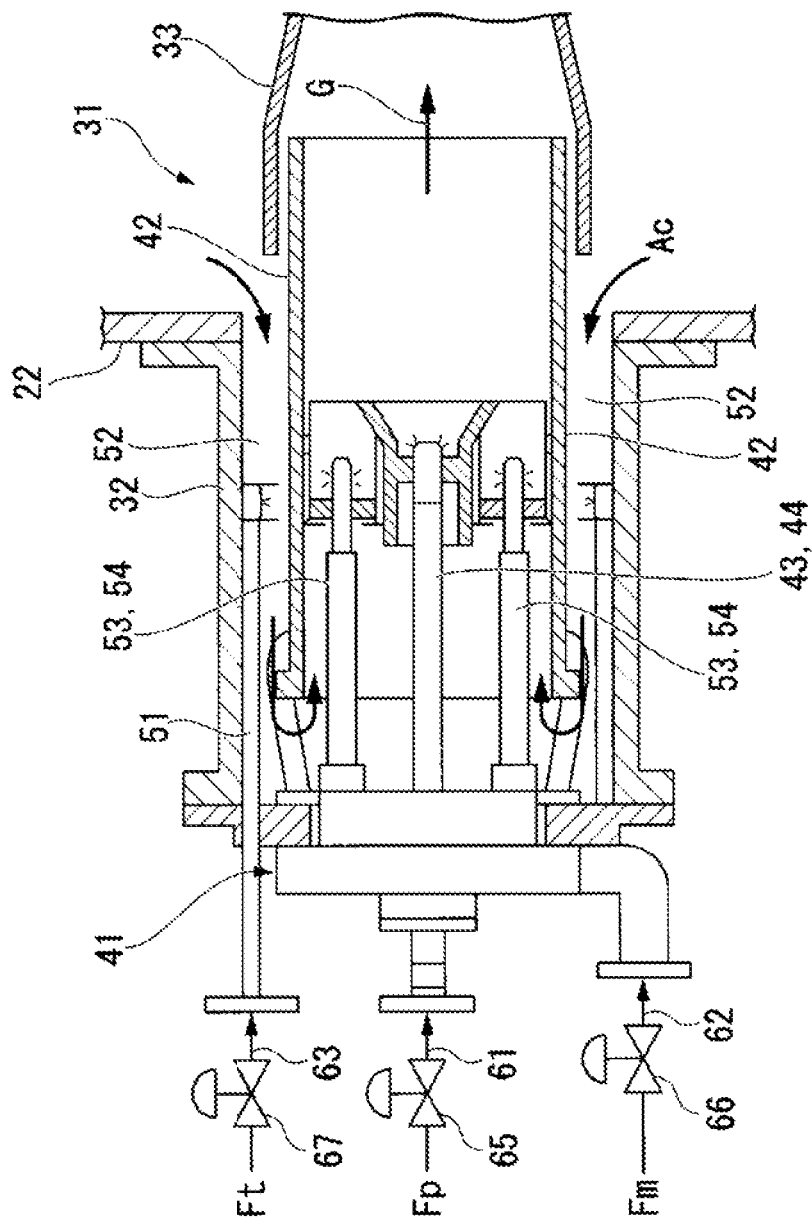
FIG. 2 is a cross-sectional view of a combustor according to the embodiment of the present invention.

As illustrated in FIG. 2, the combustor 31 includes: an external cylinder 32 fixed to the turbine casing 22; a combustion liner 33 (or transition piece) 33 that is disposed within the turbine casing 22 and guides the combustion gas into a combustion gas flow channel of the turbine 21; and a fuel supplier 41 that supplies fuel and air to the combustion liner 33.

Figure 3:
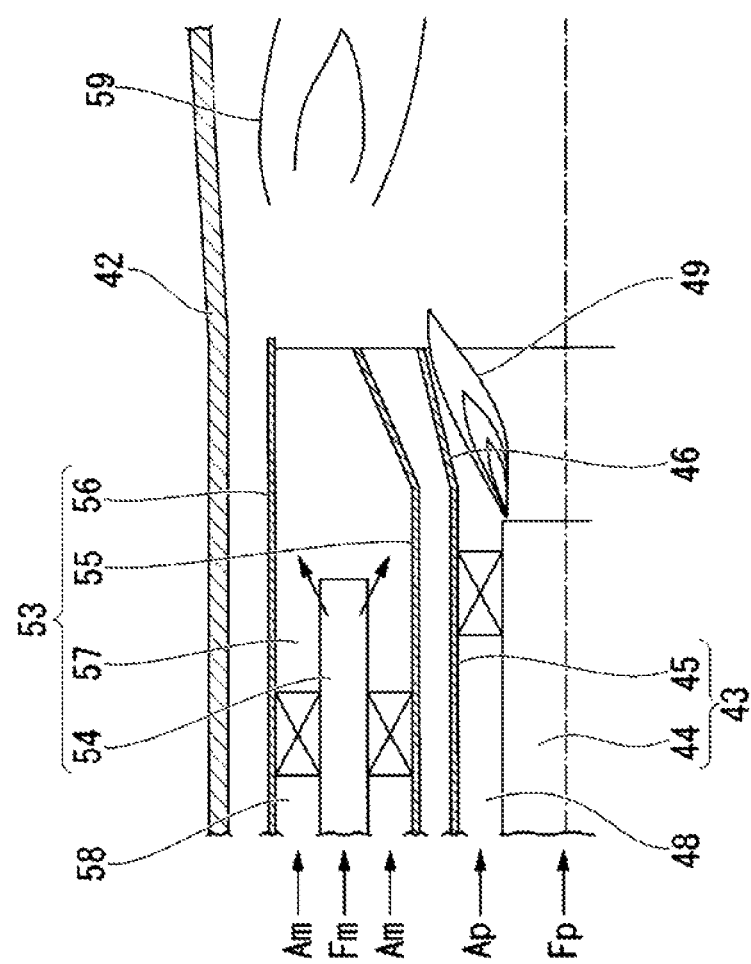
FIG. 3 is a cross-sectional view of the main portion of the combustor according to the embodiment of the present invention.

As illustrated in FIGS. 2 and 3, the fuel supplier 41 includes: a combustor basket 42; a pilot burner (first burner) 43 disposed on the central axial line of the combustor basket 42; multiple main burners (second burners) 53 disposed at equal intervals in a circumferential direction around the pilot burner 43; and a top hat nozzle 51 disposed on an inner peripheral side of the external cylinder 32 and an outer peripheral side of the combustor basket 42. Note that in the following, with respect to a direction in which the central axial line of the combustor basket 42 extends, a side toward which combustion gas G flows in the combustion liner 33 will be called a "downstream side" and the side opposite therefrom will be called an "upstream side".

The pilot burner 43 includes a pilot nozzle 44 disposed on the central axial line of the combustor basket 42 and a tubular pilot air tube 45 surrounding the outer periphery of the pilot nozzle 44. A downstream side of the pilot air tube 45 forms a pilot cone 46 whose diameter gradually becomes larger toward the downstream side. The inner peripheral side of the pilot air tube 45 forms a pilot air channel 48 through which a compressed air Ac from the compressor 11 flows as a pilot air Ap. A pilot fuel Fp sprayed from the pilot nozzle 44 is combusted (through diffusion combustion) in the pilot air Ap discharged from the pilot air channel 48 to form a diffusion flame 49.

Each of the main burners 53 includes: a tubular main air internal cylinder 55 surrounding the outer periphery of the pilot air tube 45; a tubular main air external cylinder 56 surrounding the outer periphery of the main air internal cylinder 55; multiple partitioning plates 57; and a main nozzle 54 disposed between the multiple partitioning plates 57. The multiple partitioning plates 57 divide an annular space between the outer peripheral side of the main air internal cylinder 55 and the inner peripheral side of the main air external cylinder 56 into multiple spaces in the circumferential direction. The multiple spaces defined by the main air internal cylinder 55, the main air external cylinder 56, and the multiple partitioning plates 57 form a main air channel 58 in which the compressed air Ac from the compressor 11 flows as a main air Am. A main fuel Fm is sprayed from the main nozzle 54 disposed within the main air channel 58 into the main air Am flowing in the main air channel 58. As a result, premixed gas, which is a mixture of the main air Am and the main fuel Fm, flows in the main air channel 58, from a tip end portion (downstream end) of the main nozzle 54 toward the downstream side. After flowing out of the main air channel 58, this premixed gas is combusted (through premixed combustion) and forms a premixed flame 59. The above-described diffusion flame 49 fulfills a role of stabilizing this premixed flame 59.

A space between the inner peripheral side of the external cylinder 32 and the outer peripheral side of the combustor basket 42 forms a compressed air channel 52 that guides the compressed air Ac from the compressor 11 to the combustor basket 42. The top hat nozzle 51 sprays a top hat fuel Ft into this compressed air channel 52. Thus when the top hat fuel Ft is sprayed into the compressed air channel 52, the top hat fuel Ft is mixed into the main air Am and the pilot air Ap.

As illustrated in FIGS. 1 and 2, the gas turbine plant according to the present embodiment further includes: a pilot fuel line (first fuel system) 61 that guides the pilot fuel Fp to the pilot nozzle 44; a main fuel line (second fuel system) 62 that guides the main fuel Fm to the main nozzle 54; a top hat fuel line (upstream supply system) 63 that guides the top hat fuel Ft to the top hat nozzle 51; a pilot fuel valve 65 that adjusts a flow volume of the pilot fuel Fp; a main fuel valve 66 that adjusts a flow volume of the main fuel Fm; a top hat fuel valve 67 that adjusts a flow volume of the top hat fuel Ft; and a control device 100 that controls operations of the fuel valves 65, 66, 67, and the like.

The pilot fuel line 61, the main fuel line 62, and the top hat fuel line 63 all branch out from a fuel line 60. The pilot fuel valve 65 is provided in the pilot fuel line 61, the main fuel valve 66 is provided in the main fuel line 62, and the top hat fuel valve 67 is provided in the top hat fuel line 63.

As illustrated in FIG. 1, the gas turbine plant according to the present embodiment further includes: an RPM gauge 71 that detects an RPM N of the gas turbine rotor 28; an output gauge 72 that detects an output PW of the generator 29; an intake temperature gauge 73 that detects an intake temperature Ti, which is a temperature of air A taken in by the compressor 11; an intake pressure gauge 74 that detects an intake pressure (atmospheric pressure) Pi, which is a pressure of the air taken in by the compressor 11; a blade path temperature gauge 75 that detects a blade path temperature Tb; and an exhaust gas temperature gauge 76 that detects a temperature Te of exhaust gas. The blade path temperature Tb detected by the blade path temperature gauge 75 is the temperature of the combustion gas immediately after a final stage of the turbine 21. The temperature Te of the exhaust gas detected by the exhaust gas temperature gauge 76 is the temperature of the exhaust gas within an exhaust duct downstream from the final stage of the turbine 21.

Figure 4:
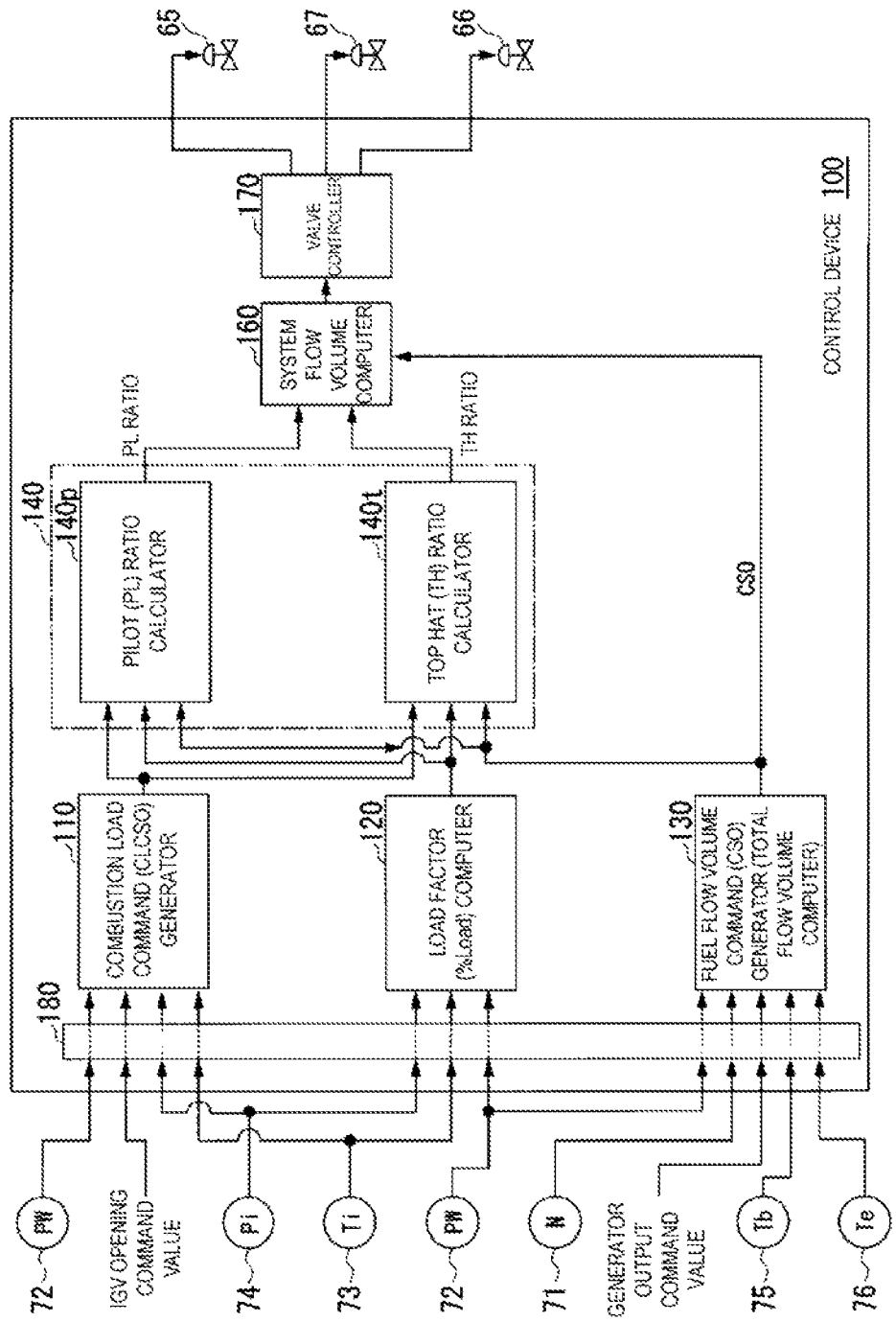
FIG. 4 is a function block diagram illustrating a control device according to the embodiment of the present invention.

As, illustrated in FIG. 4, the control device 100 includes: an interface 180 that receives detection values from the detection gauges and the like; a combustion load command generator 110 that generates a combustion load command value CLCSO; a load factor computer 120 that determines a current load factor % Load of the gas turbine 10; a fuel flow volume command generator 130 that generates a fuel flow volume command value CSO; a pilot ratio calculator 140p that calculates a pilot ratio (PL ratio), which is a ratio of a pilot fuel flow volume Fpf to a total fuel flow volume; a top hat ratio calculator 140t that calculates a top hat ratio (TH ratio), which is a ratio of a top hat fuel flow volume Ftf to the total fuel flow volume; a system flow volume computer 160 that determines flow volumes in the fuel lines 61, 62, and 63; and a valve controller 170 that outputs control signals to the fuel valves 65, 66, and 67 in accordance with the respective flow volumes in the fuel lines 61, 62, and 63. Note that in the present embodiment, the pilot ratio calculator 140p and the top hat ratio calculator 140t constitute a flow volume ratio calculation device 140.

The combustion load command value CLCSO is a parameter that is obtained by nondimensionalizing an inlet temperature of the combustion gas in the turbine 21 and that has a positive correlation with the inlet temperature. The combustion load command value CLCSO is set so as to be 0% when the inlet temperature is at its lower limit and 100% when the inlet temperature is at its upper limit. For example, when the lower limit of the inlet temperature is 700° C. and the upper limit of the inlet temperature is 1,500° C., the combustion load command value CLCSO is expressed by the following equation.

$$\text{CLCSO (\%)} = \{(\text{measured value of generator output} - 700° \text{ CMW})/(1{,}500° \text{ CMW} - 700° \text{ CMW})\} \times 100,$$

where 700° CMW is the generator output when the inlet temperature is at its lower limit of 700° C., and 1,500° CMW is the generator output when the inlet temperature is at its upper limit of 1,500° C.

Figure 5:
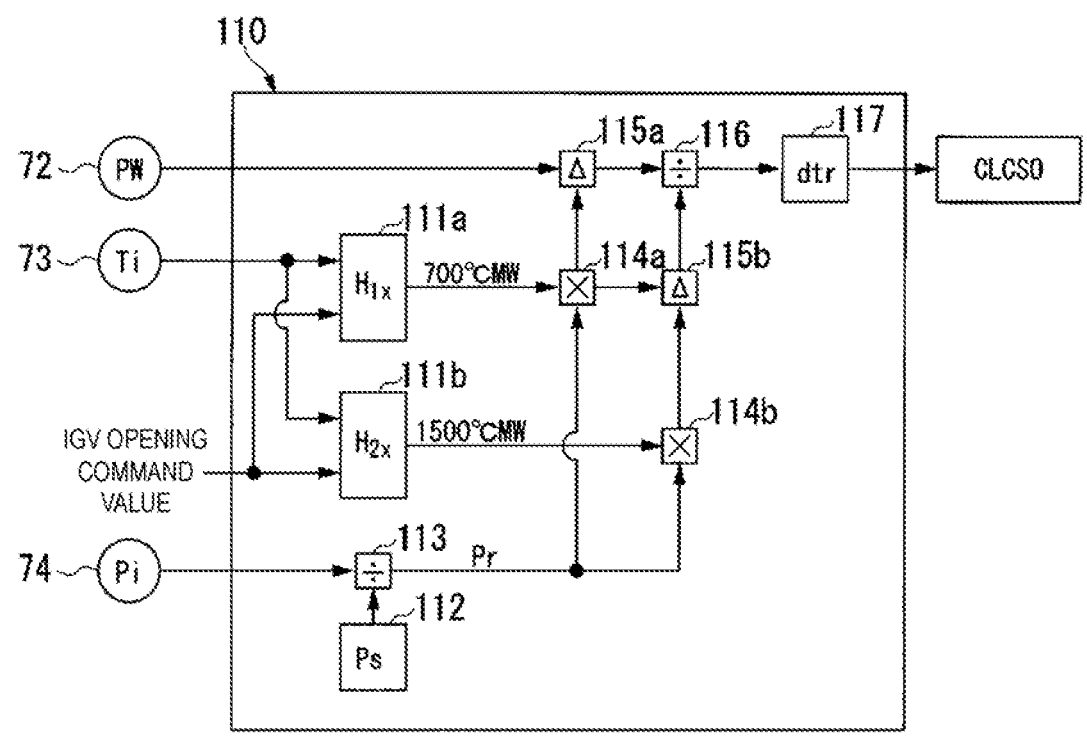
FIG. 5 is a function block diagram illustrating a combustion load command generator according to the embodiment of the present invention.

As illustrated in FIG. 5, the combustion load command generator 110 includes a first output computer 111a, a second output computer 111b, a standard atmospheric pressure generator 112, a first divider 113, a first multiplier 114a, a second multiplier 114b, a first subtractor 115a, a second subtractor 115b, a second divider 116, and a limiter 117. The first output computer 111a determines the generator output 700° CMW occurring when the inlet temperature is at its lower limit of 700° C. The second output computer 111b determines the generator output 700° 1500° CMW occurring when the inlet temperature is at its upper limit of 1,500° C. The standard atmospheric pressure generator 112 generates a preset standard atmospheric pressure Ps. The first divider 113 determines an intake pressure ratio Pr, which is a ratio of the intake pressure Pi detected by the intake pressure gauge 74 to the standard atmospheric pressure (standard intake pressure) Ps. The first multiplier 114a multiplies the generator output 700° CMW, determined by the first output computer 111a, by the intake pressure ratio Pr. The second multiplier 114b multiplies the generator output 1,500° CMW, determined by the second output computer 111b, by the intake pressure ratio Pr. The first subtractor 115a subtracts the multiplication result obtained by the first multiplier 114a from the measured output PW of the generator 29 detected by the output gauge 72. The second subtractor 115b subtracts the multiplication result obtained by the first multiplier 114a from the multiplication result obtained by the second multiplier 114b. The second divider 116 divides the subtraction result obtained by the first subtractor 115a by the subtraction result obtained by the second subtractor 115b. The limiter 117 limits an increase/decrease rate of the output from the second divider 116.

The first output computer 111a determines the generator output 700° CMW occurring when the inlet temperature is 700° C. using a function $H_1x$, with the intake temperature Ti and an IGV opening command value defined as variable parameters. The second output computer 111b determines the generator output 1500° CMW occurring when the inlet temperature is 1,500° C. using a function H₂x, with the intake temperature Ti and the IGV opening command value defined as variable parameters.

Figure 10:
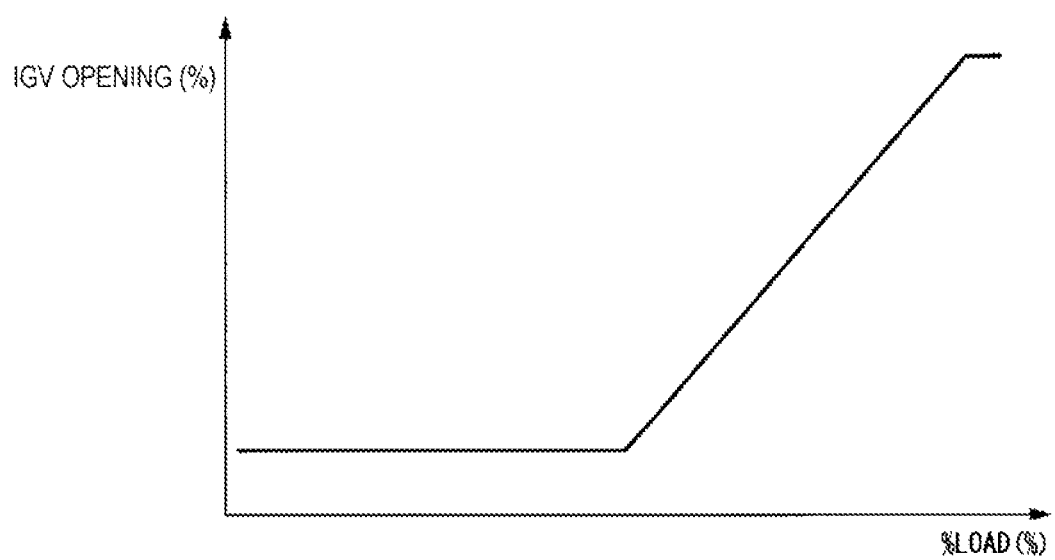
FIG. 10 is a graph showing a relationship between a load factor and an IGV opening according to the embodiment of the present invention.

Here, the IGV opening command value is a command value that is supplied to the driver 16 of the IGV 14 by the control device 100, and that specifies an IGV opening. This IGV opening command value is determined, for example, from the atmospheric pressure Pi, which is the pressure at the inlet of the compressor 11, a pressure at the outlet of the compressor 11, the current load factor % Load of the gas turbine 10, and the like. A relationship between the load factor % Load and the IGV opening is, as shown in FIG. 10, for example, a relationship in which the IGV opening increases as the load factor % Load increases. The amount of increase in the IGV opening relative to the amount of increase in the load factor % Load, the load factor % Load at which the IGV opening begins to increase, and the like are changed depending on the operation plan for the gas turbine 10, the atmospheric pressure Pi, which is the pressure at the inlet of the compressor 11, and the like. Although the foregoing describes an example of determining the IGV opening from the load factor % Load, the IGV opening may be determined using the output PW of the generator 29, which is the output of the gas turbine 10, instead of the load factor % Load.

The output computers 111a and 111b of the combustion load command generator 110 change the respective known values of 700° CMW and 1,500° CMW in the case where the intake temperature and the IGV opening command value are reference values to values corresponding to the actual intake temperature and IGV opening command value, and output the respective post-change values as 700° CMW and 1,500° CMW.

Furthermore, the 700° CMW and 1,500° CMW are corrected in accordance with a measured value Pi of the intake pressure (atmospheric pressure). Specifically, the first, divider 113 determines the intake pressure ratio Pr, which is a ratio of the intake pressure (atmospheric pressure) Pi detected by the intake pressure gauge 74 to the standard atmospheric pressure (standard intake pressure) Ps from the standard atmospheric pressure generator 112. The first multiplier 114a multiplies the 700° CMW from the first output computer 111a by the intake pressure ratio Pr to correct the 700° CMW to a value corresponding to the intake pressure ratio Pr. The second multiplier 114b multiplies the 1,500° CMW from the second output computer 111b by the intake pressure ratio Pr to correct the 1,500° CMW to a value corresponding to the intake pressure ratio Pr. In other words, through the foregoing, the known values of 700° CMW and 1,500° CMW in the case where the intake temperature and the IGV opening command value are reference values are corrected to values corresponding to the measured intake temperature Ti, the IGV opening command value, and the measured intake pressure ratio Pr.

The first subtractor 115a subtracts the 700° CMW corrected with the intake pressure ratio Pr from the measured output PW of the generator 29 detected by the output gauge 72. In other words, the first subtractor 115a determines the value of the numerator in the above equation. The second subtractor 115b subtracts the 700° CMW corrected with the intake pressure ratio Pr from the 1,500° CMW corrected with the intake pressure ratio Pr. In other words, the second subtractor 115b determines the value of the denominator in the above equation.

The second divider 116 divides the value of the numerator in the above equation, determined by the first subtractor 115a, by the value of the denominator in the above equation, determined by the second subtractor 115b, and outputs the resulting value as the combustion load command value. The limiter 117 limits the increase/decrease rate of the combustion load command value, which is an amount of change in the combustion load command value from the second divider 116 per unit time, so that the increase/decrease rate is less than or equal to a predetermined value.

Although the foregoing describes the lower limit of the inlet temperature of the combustion gas in the turbine 21 as being 700° C. and the upper limit thereof being 1,500° C., depending on the model type of the combustor 31 and the like, the lower limit and upper limit of the inlet temperature of the combustion gas in the turbine 21 may have different values from those in the above example.

The combustion load command value CLCSO, with the increase/decrease rate thereof limited by the limiter 117, is output from the combustion load command generator 110.

Figure 6:
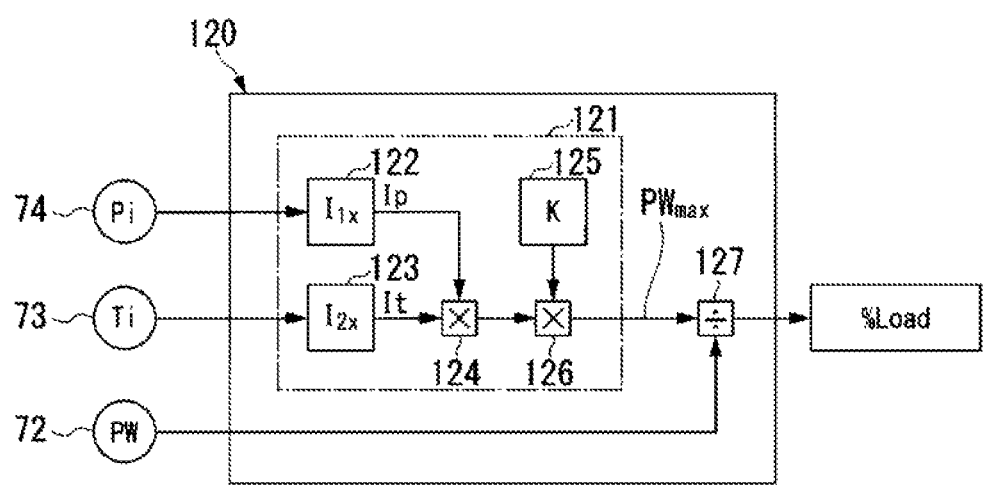
FIG. 6 is a function block diagram illustrating a load factor computer according to the embodiment of the present invention.

The load factor % Load of the gas turbine 10 is a percentage of a current load PW relative to a maximum load PWmax permitted in the current state of the gas turbine 10. As illustrated in FIG. 6, the load factor computer 120 includes a maximum load computer 121 that determines the maximum load PWmax permitted in the current state of the gas turbine 10, and a divider 127 that divides the measured load PW, which is the output of the generator 29 detected by the output gauge 72, by the maximum load PWmax.

The maximum load computer 121 includes: a first load coefficient computer 122 that determines a maximum load coefficient Ip based on the intake pressure Pi; a second load coefficient computer 123 that determines a maximum load coefficient It based on the intake temperature Ti; a first multiplier 124 that multiplies the maximum load coefficient Ip by the maximum load coefficient It; a degradation coefficient generator 125 that generates a degradation coefficient K based on an operating time of the gas turbine 10; and a second multiplier 126 that multiplies the multiplication result from the first multiplier 124 by the degradation coefficient K. In other words, the maximum load computer 121 determines the maximum load PWmax based on the measured intake pressure Pi detected by the intake pressure gauge 74, the measured intake temperature Ti detected by the intake temperature gauge 73, and the degradation coefficient K of the gas turbine 10. As described earlier, the divider 127 divides the measured load PW, which is the output of the generator 29 detected by the output gauge 72, by the maximum load PWmax, and outputs the resulting value as the load factor % Load.

The fuel flow volume command value CSO is a value specifying a total flow volume of the fuel supplied to the combustor 31 (referred to as "total fuel flow volume" hereinafter). As such, the fuel flow volume command generator 130 functions as a total flow volume computer. Therefore, as will be described later, the fuel flow volume command generator 130 executes a total fuel flow volume computing step in which the total fuel flow volume is determined.

Figure 7:
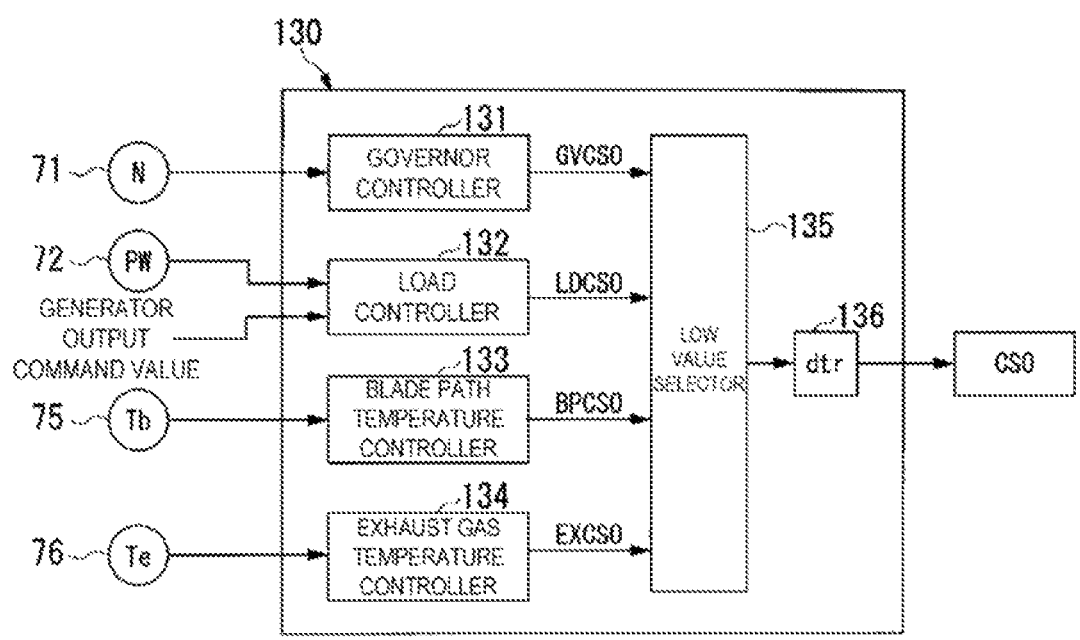
FIG. 7 is a function block diagram illustrating a fuel flow volume command generator according to the embodiment of the present invention.

As illustrated in FIG. 7, the fuel flow volume command generator 130 includes a governor controller 131, a load controller 132, a first temperature controller 133, a second temperature controller 134, a low value selector 135, and a limiter 136. The governor controller 131 outputs a command value for controlling the total fuel flow volume so that the RPM N of the gas turbine rotor 28 becomes a target RPM. The load controller 132 outputs a command value for controlling the total fuel flow volume so that the generator output PW matches a generator output command value. The first temperature controller 133 outputs a command value for controlling the total fuel flow volume so that the blade path temperature Tb of the gas turbine does not exceed its upper limit. The second temperature controller 134 outputs a command value for controlling the total fuel flow volume so that the exhaust gas temperature Te does not exceed its upper limit. The low value selector 135 outputs the minimum or lowest value among the command values from the controllers 131 to 134. The limiter 136 limits an increase/decrease rate of the command from the low value selector 135.

The governor controller 131 receives the RPM N of the gas turbine rotor 28 from the RPM gauge 71 and outputs a command value GVCSO for controlling the total fuel flow volume so that the RPM N of the gas turbine rotor 28 matches the target RPM. Specifically, the governor controller 131 compares the measured RPM N of the gas turbine rotor 28 with a preset GV setting value, and outputs a proportional control signal as the command value GVCSO.

The load controller 132 receives the measured output PW of the generator 29 from the output gauge 72, and the generator output command value from a host control device 90 (see FIG. 1). The load controller 132 outputs a command value LDCSO for controlling the total fuel flow volume so that the measured output PW matches the generator output command value. Specifically, the load controller 132 compares the measured output PW with the generator output command value, computes a proportional integral, and outputs the computation result as the command value LDCSO.

The first temperature controller 133 receives the blade path temperature Tb from the blade path temperature gauge 75, and outputs a command value BPCSO for controlling the total fuel flow volume so that the blade path temperature Tb does not exceed its upper limit. Specifically, the first temperature controller 133 compares the measured blade path temperature Tb with the upper limit thereof, computes a proportional integral, and outputs the computation result as the command value BPCSO.

The second temperature controller 134 receives the exhaust gas temperature Te from the exhaust gas temperature gauge 76, and outputs a command value EXCSO for controlling the total fuel flow volume so that the exhaust gas temperature Te does not exceed its upper limit. Specifically, the second temperature controller 134 compares the measured exhaust gas temperature Te with the upper limit thereof, computes a proportional integral, and outputs the computation result as the command value EXCSO.

The low value selector 135 selects the minimum or lowest value among the command values from the controllers 131 to 134, and outputs the selected command value. The limiter 136 limits the increase/decrease rate of the command from the low value selector 135, and outputs the result as the fuel flow volume command value CSO.

Figure 8:
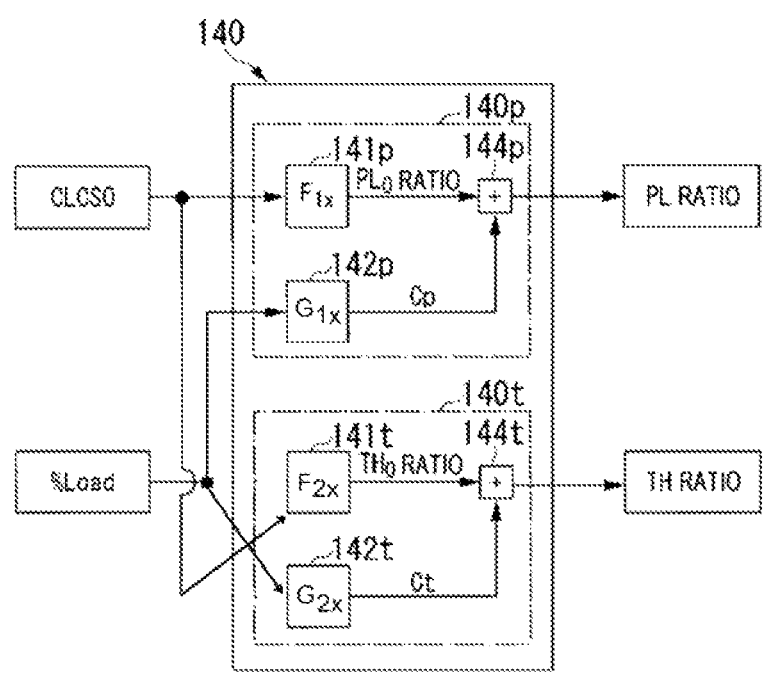
FIG. 8 is a function block diagram illustrating a flow volume ratio calculation device according to the embodiment of the present invention.

The pilot ratio (PL ratio) is a ratio of the pilot fuel flow volume Fpf to the total fuel flow volume. As illustrated in FIG. 8, the pilot ratio calculator 140$p$ includes: a $PL_0$ ratio computer (flow volume ratio computer) 141$p$ that determines the $PL_0$ ratio, which is the pilot ratio based on the combustion load command value CLCSO; a correction value computer 142$p$ that determines a correction value Cp based on the load factor % Load; and a corrector 144$p$ that corrects the $PL_0$ ratio with the correction value Cp.

Figure 11:
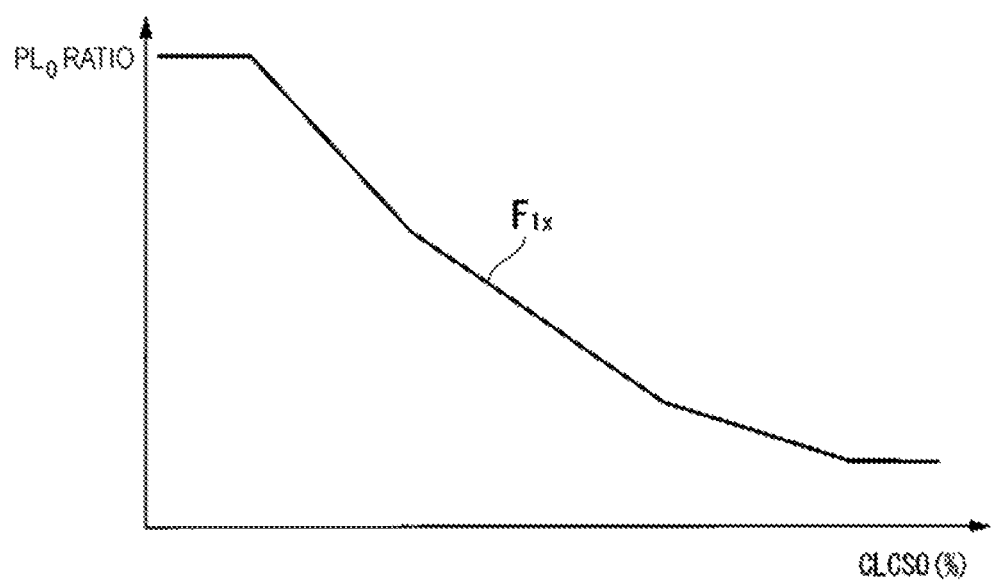
FIG. 11 is a graph showing a relationship between a pre-correction pilot ratio ($PL_0$ ratio) and a combustion load command value CLCSO according to the embodiment of the present invention.

The $PL_0$ ratio computer 141$p$ has a function $F_1 x$ defining a relationship between the combustion load command value CLCSO, which has a positive correlation with the inlet temperature of the combustion gas in the turbine 21, and the $PL_0$ ratio. As shown in FIG. 11, the function $F_1 x$ is a function in which the $PL_0$ ratio gradually decreases as the combustion load command value CLCSO increases, or in other words, as the inlet temperature of the combustion gas rises. The $PL_0$ ratio computer 141$p$ receives the combustion load command value CLCSO from the combustion load command generator 110, and determines the $PL_0$ ratio corresponding to that combustion load command value CLCSO using the function $F_1 x$. Although the relationship between the combustion load command value CLCSO and the $PL_0$ ratio is defined by the function $F_1 x$ here, the relationship may be defined by a map.

Figure 12:
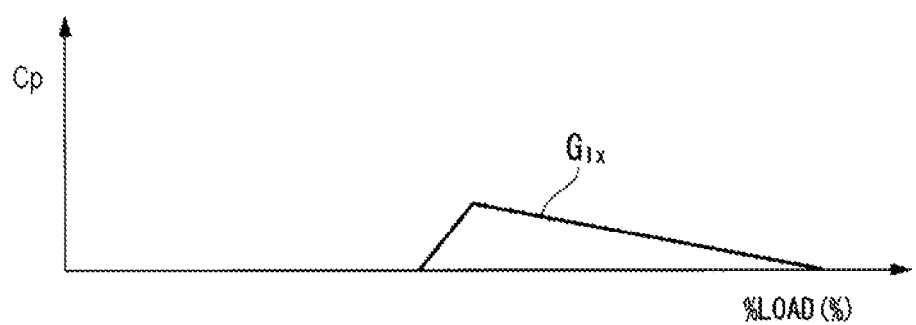
FIG. 12 is a graph showing a relationship between a pilot ratio correction value Cp and the combustion load command value CLCSO according to the embodiment of the present invention.

As shown in FIG. 12, the correction value computer 142$p$ has a function $G_1 x$ defining a relationship between the load factor % Load and the correction value Cp. The correction value computer 142$p$ receives the load factor % Load from the load factor computer 120, and determines a correction value Ci based on the current load factor % Load using the function $G_1 x$. Although the relationship between the load factor % Load and the correction value Cp is defined by the function $G_1 x$ here, the relationship may be defined by a map.

The top hat ratio (TH ratio) is a ratio of the top hat fuel flow volume Ftf to the total fuel flow volume. As illustrated in FIG. 8, the top hat ratio calculator 140$t$ includes: a $TH_0$ ratio computer (flow volume ratio computer) 141$t$ that determines the $TH_0$ ratio, which is the top hat ratio based on the combustion load command value CLCSO; a correction value computer 142$t$ that determines a correction value based on the load factor % Load; a fluctuation detector 144 that detects fluctuation in the fuel flow volume command value CSO; and a corrector 144$t$ that corrects the $TH_0$ ratio with the correction value Ct.

Figure 13:
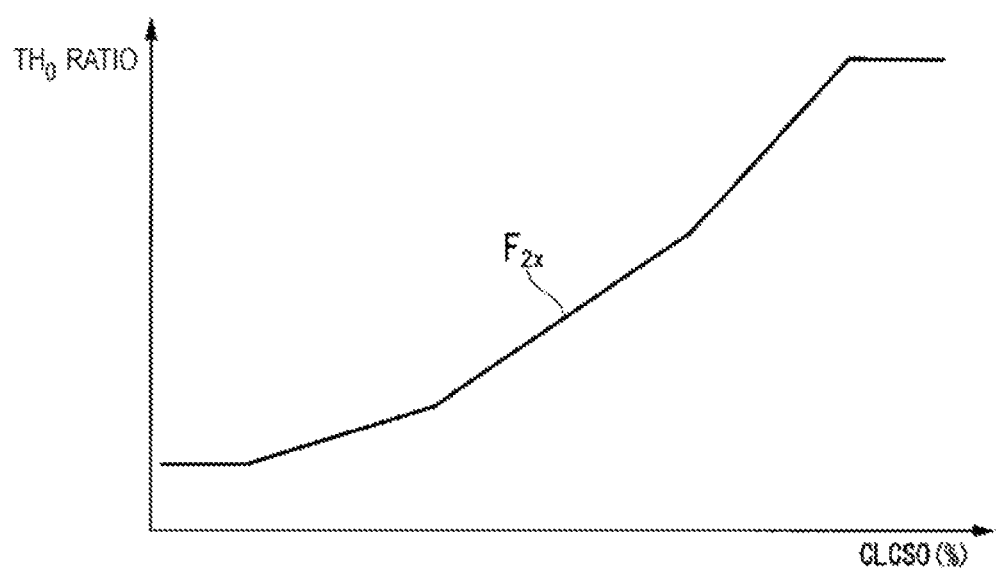
FIG. 13 is a graph showing a relationship between a pre-correction top hat ratio ($TH_0$ ratio) and the combustion load command value CLCSO according to the embodiment of the present invention.

The $TH_0$ ratio computer 141$t$ has a function $F_2 x$ defining a relationship between the combustion load command value CLCSO and the $TH_0$ ratio. As illustrated in FIG. 13, the function $F_2 x$ is a function in which the $TH_0$ ratio gradually increases as the combustion load command value CLCSO increases, or in other words, as the inlet temperature of the combustion gas rises. The $TH_0$ ratio computer 141$t$ receives the combustion load command value CLCSO from the combustion load command generator 110, and determines the $TH_0$ ratio corresponding to that combustion load command value CLCSO using the function $F_2 x$. Although the relationship between the combustion load command value CLCSO and the $TH_0$ ratio is defined by the function $F_2 x$ here, the relationship may be defined by a map.

Figure 14:
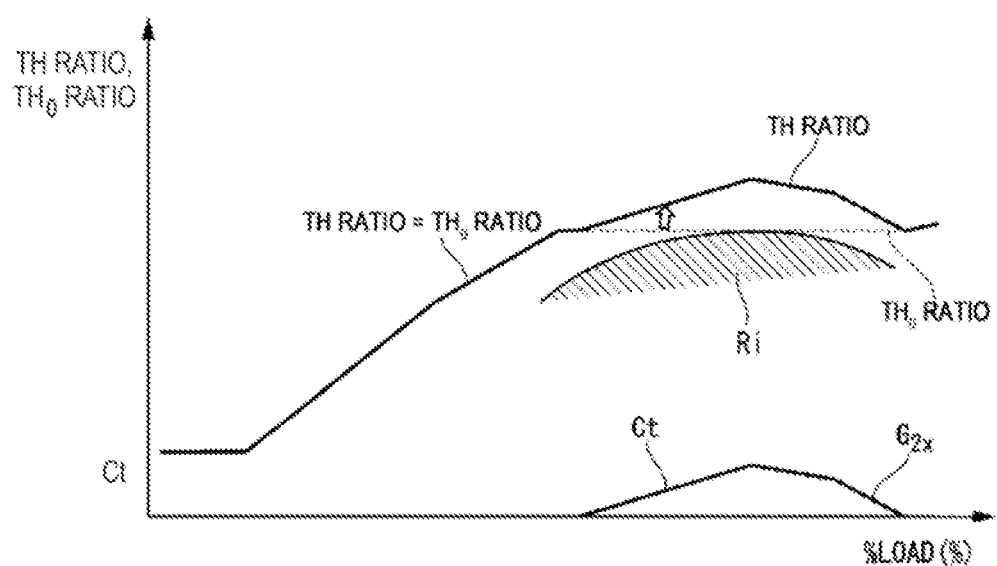
FIG. 14 is a graph showing a relationship between the pre-correction top hat ratio ($TH_0$ ratio) and a post-correction tap hat ratio (TH ratio), and a load factor % Load; and a relationship between a top hat ratio correction value Ct and the load factor % Load according to the embodiment of the present invention.

As shown in FIG. 14, the correction value computer 142$t$ has a function $G_2 x$ defining a relationship between the load factor % Load and the correction value Ct. The correction value computer 142$t$ receives the load factor % Load from the load factor computer 120, and determines the correction value Ct based on the current load factor % Load using the function $G_2 x$. Although the relationship between the load factor % Load and the correction value Ct is defined by the function $G_2 x$ here, the relationship may be defined by a map.

Figure 9:
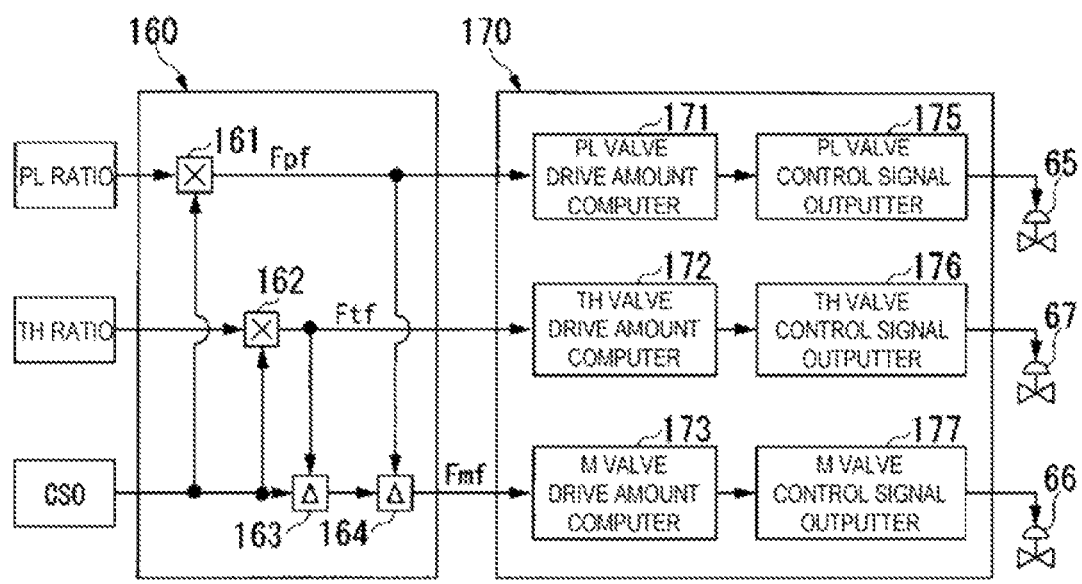
FIG. 9 is a function block diagram illustrating a system flow volume computer and a valve controller according to the embodiment of the present invention.

As illustrated in FIG. 9, the system flow volume computer 160 includes: a first multiplier 161 that determines the pilot fuel flow volume Fpf using the PL ratio determined by the pilot ratio calculator 140$p$; a second multiplier 162 that determines the top hat fuel flow volume Ftf from the TH ratio determined by the top hat ratio calculator 140$t$; a first subtractor 163 that subtracts the top hat fuel flow volume Ftf from the fuel flow volume command value CSO specifying the total fuel flow volume; and a second subtractor 164 that further subtracts the pilot fuel flow volume Fpf from the subtraction result obtained by the first subtractor 163.

The first multiplier 161 multiplies the fuel flow volume command value CSO specifying the total fuel flow volume by the PL ratio determined by the pilot ratio calculator 140*p* to determine the pilot fuel flow volume Fpf, and outputs the pilot fuel flow volume Fpf to the valve controller 170. The second multiplier 162 multiplies the fuel flow volume command value CSO specifying the total fuel flow volume by the TH ratio determined by the top hat ratio calculator 140*t* to determine the top hat fuel flow volume Ftf, and outputs the top hat fuel flow volume Ftf to the valve controller 170. The first subtractor 163 subtracts the top hat fuel flow volume Ftf from the fuel flow volume command value CSO specifying the total fuel flow volume, as described earlier. The second subtractor 164 further subtracts the pilot fuel flow volume Fpf from the subtraction result obtained by the first subtractor 163, and outputs the subtraction result to the valve controller 170 as a main fuel flow volume Fmf. In other words, the system flow volume computer 160 executes a system flow volume computing step in which each of the fuel flow volumes is determined.

As illustrated in FIG. 9, the valve controller 170 includes: a valve drive amount computer 171 that determines a drive amount of the pilot fuel valve 65; a valve control signal outputter 175 that outputs a control signal to the pilot fuel valve 65; a valve drive amount computer 172 that determines a drive amount of the top hat fuel valve 67; a valve control signal outputter 176 that outputs a control signal to the top hat fuel valve 67; a valve drive amount computer 173 that determines a drive amount of the main fuel valve 66; and a valve control signal outputter 177 that outputs a control signal to the main fuel valve 66.

The valve drive amount computer 171 that determines the drive amount of the pilot fuel valve 65 determines the drive amount of the pilot fuel valve 65 in accordance with the pilot fuel flow volume Fpf determined by the system flow volume computer 160. The valve control signal outputter 175 creates a control signal in accordance with the drive amount of the pilot fuel valve 65 and outputs the control signal to the pilot fuel valve 65. The valve drive amount computer 172 that determines the drive amount of the top hat fuel valve 67 determines the drive amount of the top hat fuel valve 67 in accordance with the top hat fuel flow volume Ftf determined by the system flow volume computer 160. The valve control signal outputter 176 creates a control signal in accordance with the drive amount of the top hat fuel valve 67 and outputs the control signal to the top hat fuel valve 67. The valve drive amount computer 173 that determines the drive amount of the main fuel valve 66 determines the drive amount of the main fuel valve 66 in accordance with the main fuel flow volume Fmf determined by the system flow volume computer 160. The valve control signal outputter 177 creates a control signal in accordance with the drive amount of the main fuel valve 66 and outputs the control signal to the main fuel valve 66. In other words, the valve controller 170 executes a valve controlling step in which the control signal is output to each of the fuel valves.

Figure 16:
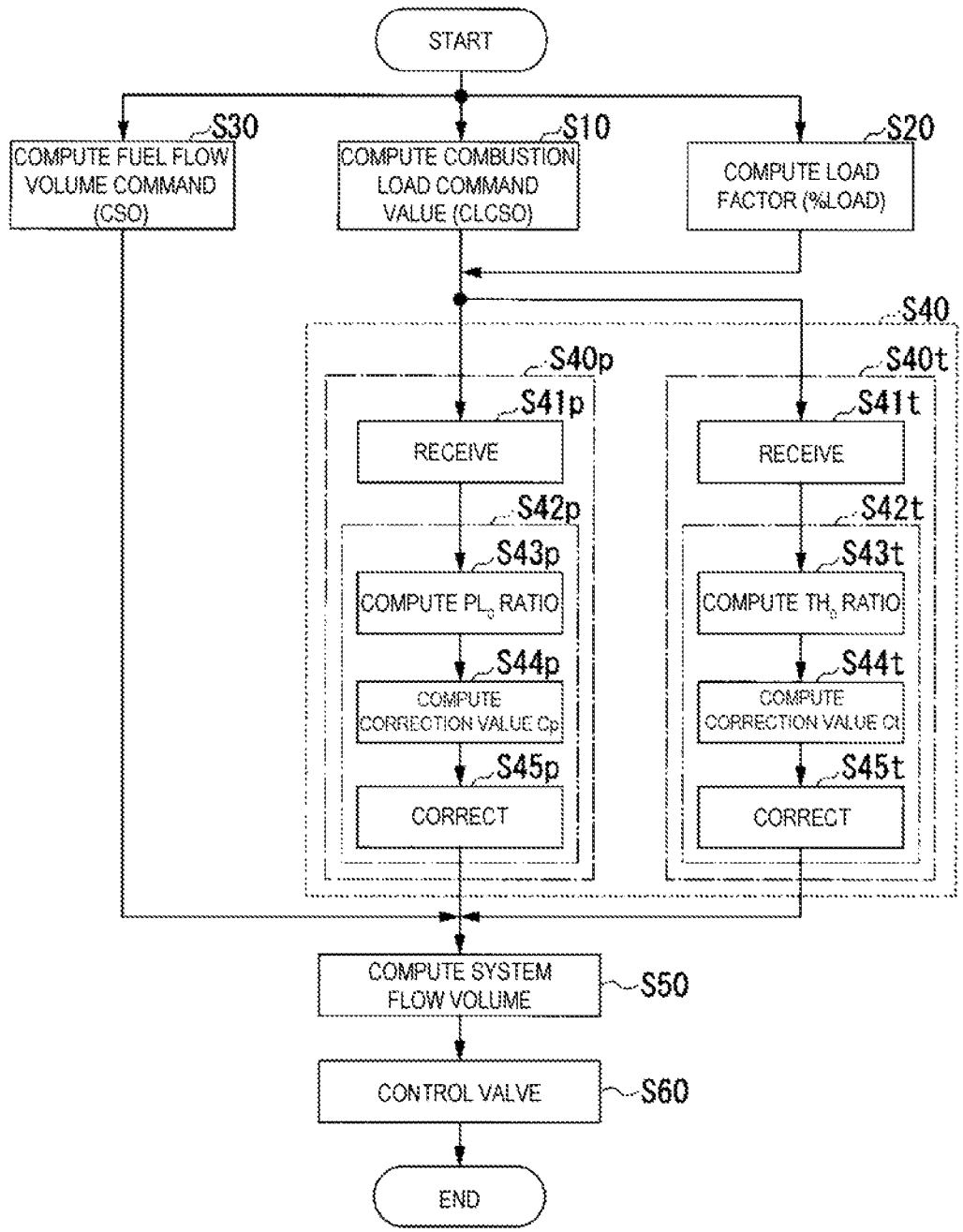
FIG. 16 is a flowchart illustrating operations of the control device according to the embodiment of the present invention.

Next, operations of the control device 100 will be described in accordance with the flowchart illustrated in FIG. 16.

As described earlier, the combustion load command generator 110 determines the combustion load command value CLCSO, which is a parameter having a positive correlation with the inlet temperature of the combustion gas in the turbine 21, using the measured output PW of the generator 29 detected by the output gauge 72, the IGV opening command value, the intake pressure Pi detected by the intake pressure gauge 74, and the intake temperature Ti detected by the intake temperature gauge 73 (S10: an inlet temperature-correlated value computing step).

The load factor computer 120 determines the current load factor % Load of the gas turbine 10 (S20: a load factor computing step). At this time, as described earlier, the load factor computer 120 determines the maximum load PWmax of the gas turbine 10, based on the current intake pressure Pi and intake temperature Ti, from the intake pressure Pi detected by the intake pressure gauge 74 and the intake temperature Ti detected by the intake temperature gauge 73. The load factor computer 120 divides the measured load PW, which is the output of the generator 29 detected by the output gauge 72, by the maximum load PWmax, and outputs the resulting value as the load factor % Load.

The fuel flow volume command generator 130 determines the fuel flow volume command value CSO, which specifies the total flow volume of the fuel supplied to the combustor of the gas turbine 10 (S30: a total flow volume computing step). At this time, as described earlier, the fuel flow volume command generator 130 determines multiple command values and outputs the minimum or lowest value among the multiple command values as the fuel flow volume command value CSO.

The foregoing inlet temperature-correlated value computing step (S10), load factor computing step (S20), and total flow volume computing step (S30) are executed in sequence or in parallel.

The flow volume ratio calculation device calculates the respective flow volume ratios of the fuels flowing in the fuel lines 61, 62, and 63 (S40: a flow volume ratio calculating step). This flow volume ratio calculating step (S40) includes a PL ratio calculating step (S40*p*) of calculating the pilot ratio (PL ratio), which is the ratio of the pilot fuel flow volume Fpf to the total fuel flow volume, and a TH ratio calculating step (S40*t*) of calculating the top hat ratio (TH ratio), which is the ratio of the top hat fuel flow volume Ftf to the total fuel flow volume.

In the PL ratio calculating step (S40*p*), the pilot ratio calculator 140*p* receives the combustion load command value CLCSO output by the combustion load command generator 110 and the load factor % Load output by the load factor computer 120 (S41*p*: a receiving step). From the value and factor, the PL ratio is determined (S42*p*: a PL ratio computing step). In the PL ratio computing step (S42*p*), first, as described earlier, the $PL_0$ ratio computer 141*p* determines the $PL_0$ ratio corresponding to the combustion load command value CLCSO received earlier, using the function $F_1x$ (S43*p*: a $PL_0$ ratio computing step). Next, or in parallel with the $PL_0$ ratio computing step (S43*p*), the correction value computer 142*p* determines the correction value Cp corresponding to the load factor % Load received earlier, using the function $G_1x$ (S44*p*: a correction value Cp computing step). Then, the corrector 144*p* adds the correction value Cp to the $PL_0$ ratio and outputs the resulting value as a corrected pilot ratio (PL ratio) (S45*p*: a correcting step).

In the TH ratio calculating step (S40*t*), the top hat ratio calculator 140*t* receives the combustion load command value CLCCSO output by the combustion load command generator 110 and the load factor % Load output by the load factor computer 120 (S41*t*: a receiving step). From the value and factor, the TH ratio is determined (S42*t*: a ratio computing step). In the TH ratio computing step (S42*t*), first, as described earlier, the $TH_0$ ratio computer 141*t* determines the $TH_0$ ratio corresponding to the combustion load command value CLCSO received earlier, using the function $F_2x$ (S43*t*: a $TH_0$ ratio computing step), Next, or in parallel with the $TH_0$ ratio computing step (S43*t*), the correction value computer 142*t* determines the correction value Ct corresponding to the load factor % Load received earlier, using the function $G_2x$ (S44$t$: a correction value Ct computing step). Then, the corrector 144$t$ adds the correction value Ct to the $TH_0$ ratio and outputs the resulting value as a corrected pilot ratio (PL ratio) (S45$t$: a correcting step).

The flow volume ratio calculating step (S40) is then terminated.

As described earlier, the system flow volume computer 160 determines the pilot fuel flow volume Fpf, the top hat fuel flow volume Ftf, and the main fuel flow volume Fmf relative to the total fuel flow volume indicated by the fuel flow volume command value CSO, from the PL ratio determined by the pilot ratio calculator 140$p$ and the TH ratio determined by the top hat ratio calculator 140$t$, and outputs the flow volumes to the valve controller 170 (S50: the system flow volume computing step).

As described earlier, the valve controller 170 determines the drive amount of the pilot fuel valve 65 such that the pilot fuel flow volume Fpf can be secured, and outputs a control signal specifying that drive amount to the pilot fuel valve 65. The valve controller 170 determines the drive amount of the main fuel valve 66 such that the main fuel flow volume Fmf can be secured, and outputs a control signal specifying that drive amount to the main fuel valve 66. Furthermore, the valve controller 170 determines the drive amount of the top hat fuel valve 67 such that the top hat fuel flow volume Ftf can be secured, and outputs a control signal specifying that drive amount to the top hat fuel valve 67 (S60: the valve controlling step).

Upon the control signals being output to the fuel valves 65, 66, and 67 from the valve control signal outputters 175, 176, and 177, respectively, the fuel valves 65, 66, and 67 operate in accordance with the drive amounts specified by the respective control signals. As a result, the pilot fuel Fp flows into the pilot fuel line 61 at the flow volume Fpf in accordance with the PL ratio determined by the pilot ratio calculator 140$p$. The top hat fuel Ft flows into the top hat fuel line 63 at the flow volume Ftf in accordance with the TH ratio determined by the top hat ratio calculator 140$t$. Additionally, the main fuel Fm flows into the main fuel line 62 at the flow volume Fmf obtained by subtracting the pilot fuel flow volume Fpf and the top hat fuel flow volume Ftf from the total fuel flow volume.

The series of controlling steps for the fuel valves 65, 66, and 67 executed by the control device 100 is then terminated. These controlling steps are executed repeatedly each time the interface 180 receives the detection values from the respective detection gauges and the like, for example.

Figure 15:
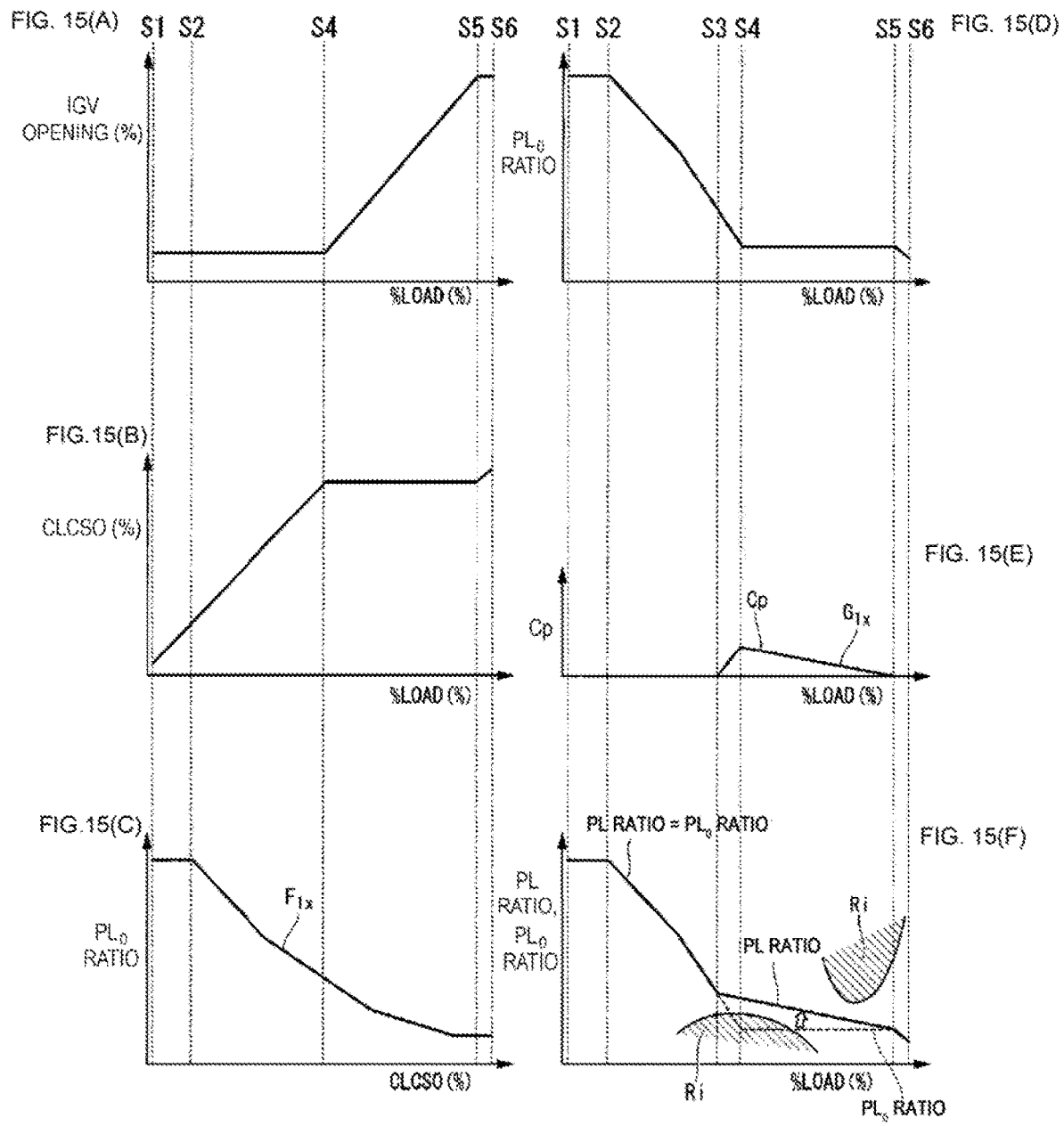
FIGS. 15A to 15F are graphs showing changes in various parameters depending on changes in a state of a gas turbine according to the embodiment of the present invention. Specifically.

Next, changes in various parameters indicating operating states of the gas turbine 10 will be described with reference to FIG. 15. Note that the state of the gas turbine 10 is uniform among S1$s$ of FIGS. 15A to 15F. Likewise, the state of the gas turbine 10 is uniform among states of the same reference symbol, namely each of S2$s$, S3$s$, S4$s$, S5$s$, and S6$s$, of FIGS. 15A to 15F.

In the example of operation of the gas turbine 10 according to the present embodiment, the IGV opening is constant at a minimum opening, up to the state S4, where the load factor % Load is a middle load factor of approximately 50%, for example, as shown in FIG. 15A. Upon the load factor % Load exceeding the middle load factor, the IGV opening increases as the load factor % Load increases. This trend continues until the state S5, which is immediately before the load factor % Load reaches 100%. The IGV opening reaches 100% in the state S5. As such, the IGV opening is constant at 100%, from the state S5, which is immediately before the load factor % Load reaches 100%, to the state S6 in which the load factor % Load is 100%. Note that the graph of FIG. 15A is the same as the graph of FIG. 10.

The inlet temperature of the combustion gas in the turbine 21, and the combustion load command value CLCSO having a positive correlation therewith increase as a fuel/air ratio (fuel/air) increases. As such, as long as the fuel/air ratio (fuel/air) is substantially constant, the inlet temperature and the combustion load command value CLCSO are also substantially constant even if the load factor % Load increases. Additionally, if the fuel/air ratio (fuel/air) increases, the inlet temperature and the combustion load command value CLCSO also increase, regardless of an increase/decrease in the load factor % Load.

As described earlier, the IGV opening is constant at the minimum opening, and an intake flow volume of the compressor 11 is substantially constant, from the state S1 of a minimum load factor to the state S4 of the middle load factor. However, the flow volume of the fuel supplied to the combustor 31 of the gas turbine 10 increases as the load factor % Load increases even outside this period. As such, the combustion load command value CLCSO also increases in this period, as shown in FIG. 15B.

As described earlier, the IGV opening increases as the load factor % Load increases, and the intake flow volume of the compressor 11 also increases as the load factor % Load increases, from the state S4 of the middle load factor to the state S5 immediately before the load factor % Load reaches 100%. However, the flow volume of the fuel supplied to the combustor 31 of the gas turbine 10 increases as the load factor % Load increases even in this period. As such, in this period, the fuel/air ratio undergoes almost no change, and the combustion load command value CLCSO also undergoes almost no change, even if the load factor % Load increases. In other words, the combustion load command value CLCSO is substantially constant in this period.

Incidentally, as described with reference to FIG. 11, the pre-correction $PL_0$ ratio is set to gradually decrease as the combustion load command value CLCSO increases (see FIG. 15C). As such, in a period where the combustion load command value CLCSO increases as the load factor % Load increases, such as from the state S1 of the minimum load factor to the state S4 of the middle load factor, the pre-correction $PL_0$ ratio gradually decreases as the load factor % Load increases, as shown in FIG. 15D. On the other hand, in a period where the combustion load command value CLCSO is substantially constant even if the load factor % Load increases, such as from the state S4 of the middle load factor to the state S5 immediately before the load factor % Load reaches 100%, the pre-correction $PL_0$ ratio is substantially constant even if the load factor % Load increases. Note that the graph of FIG. 15C is the same as the graph of FIG. 11.

The combustion state within the combustion liner 33 of the combustor 31 (see FIG. 2) changes if the load factor % Load changes, even if the combustion load command value CLCSO, or in other words, the inlet temperature of the combustion gas in the turbine 21, is constant. The pilot ratio (PL ratio) is one of the operation parameters of the gas turbine 10 that is changed in order to ensure combustion stability while ensuring the exhaust gas from the gas turbine 10 meets an environmental regulation value. However, because the pre-correction $PL_0$ ratio is constant, in the case where the combustion load command value CLCSO is constant despite the load factor % Load changing and the combustion state within the combustion liner 33 changing, it may not be possible to ensure the combustion stability if the pre-correction $PL_0$ ratio is applied as-is.

Accordingly, in the present embodiment, the $PL_0$ ratio is corrected with the correction value Cp so that the PL ratio is set to a region excluding regions Ri (regions determined by the PL ratio and the load factor % Load) where the combustion state becomes unstable, such as the occurrence of combustion oscillation, in the case where the load factor % Load changes despite the combustion load command value CLCSO being constant, as shown in FIG. 15F.

The correction value Cp is determined as follows.

First, the regions Ri (regions determined by the PL ratio and the load factor % Load) where the combustion state becomes unstable in the case where the combustion load command value CLCSO is held constant and the load factor % Load is changed are defined in advance through experiments or the like. Next, a relationship between the PL ratio and the load factor % Load that makes it possible to avoid the regions Ri where the combustion state becomes unstable when the combustion load command value CLCSO is constant is determined. Then, a difference between the PL ratio relative to the load factor % Load determined from this relationship and the $PL_0$ ratio determined in accordance with the combustion load command value CLCSO is taken as the correction value Cp, as shown in FIG. 15E. Note that the graph of FIG. 15E is the same as the graph of FIG. 12.

Thus, according to the present embodiment, the combustion stability can be improved by adding the correction value Cp in accordance with the current load factor % Load to the pre-correction $PL_0$ ratio and taking the resulting value as a final PL ratio.

Additionally, according to the present embodiment, with respect to the top hat ratio (TH ratio) as well, the $TH_0$ ratio is corrected with the correction value Ct so that the TH ratio is set to a region excluding the regions Ri (regions determined by the TH ratio and the load factor % Load) where the combustion state becomes unstable in the case where the load factor % Load changes despite the combustion load command value CLCSO being constant, as shown in FIG. 14.

The correction value Ct is determined as follows, in the same manner as the correction value Cp described earlier.

First, the regions Ri (regions determined by the TH ratio and the load factor % Load) where the combustion state becomes unstable in the case where the combustion load command value CLCSO is held constant and the load factor % Load is changed are determined in advance through experiments or the like. Next, a relationship between the TH ratio and the load factor % Load that makes it possible to avoid the regions Ri where the combustion state becomes unstable when the combustion load command value CLCSO is constant is determined. Then, a difference between the TH ratio relative to the load factor % Load determined from this relationship and the $TH_0$ ratio determined in accordance with the combustion load command value CLCSO is taken as the correction value Ct.

The combustion state of the fuel within the combustion liner 33 of the combustor 31 can be expressed by the inlet temperature of the combustion gas in the turbine 21 and a gas flow velocity within the combustion liner 33. As described earlier, the combustion load command value CLCSO is a value having a positive correlation with the inlet temperature of the combustion gas in the turbine 21. Because the load factor % Load has a positive correlation with the gas flow volume in the combustion liner 33, it can also be said that the load factor % Load is a value having a positive correlation with the gas flow velocity within the combustion liner 33. Thus, according to the present embodiment, the PL ratio and the like in accordance with the combustion state are determined from the combustion load command value CLCSO and the load factor % Load. The combustion state can thus be understood more accurately than when determining the PL ratio and the like in accordance with the combustion state determined by the combustion load command value CLCSO only, and the PL ratio and the like can be determined in accordance with that combustion state. Thus, according to the present embodiment, the occurrence of combustion oscillation within the combustion liner 33 of the combustor and the like can be suppressed, and the combustion stability within the combustion liner 33 can be further improved.

[Variation]

A variation on the flow volume ratio calculation device described above will be described with reference to FIGS. 17 and 18.

The combustion state of the fuel within the combustion liner 33 of the combustor 31 (see FIG. 17) can be expressed by two parameters. As described earlier, of the two parameters, a first parameter is a parameter correlated with the inlet temperature of the combustion gas in the turbine 21, and a second parameter is a parameter correlated with the gas flow velocity within the combustion liner 33.

Accordingly, the inlet temperature of the combustion gas in the turbine 21 may be used as the first parameter instead of the combustion load command value CLCSO described above.

Figure 17:
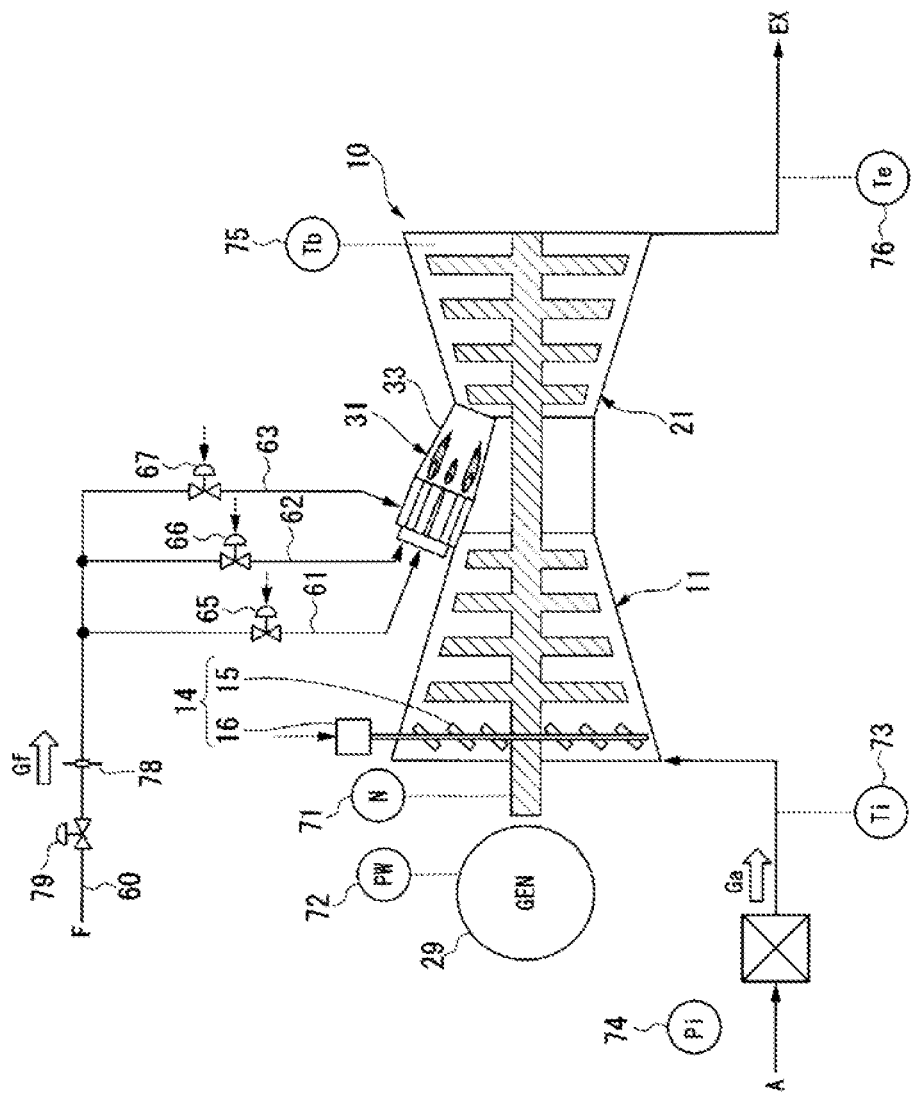
FIG. 17 is an explanatory diagram illustrating various parameters expressing combustion states of fuel in the combustor.

Additionally, another parameter correlated with the gas flow velocity within the combustion liner 33 may be used as the second parameter instead of the load factor % Load described above. As described earlier, the gas flow velocity within the combustion liner 33 has a positive correlation with the gas flow volume within the combustion liner 33. As illustrated in FIG. 17, this gas flow volume includes, in addition to the load factor % Load described in the above embodiment, the output of the gas turbine 10, a total flow volume Gf of the fuel F supplied to the combustor 31 from the multiple fuel systems, and a flow volume Ga of the air A taken in by the compressor 11.

The output of the gas turbine 10 can be expressed by the output PW of the generator 29 connected to the gas turbine 10. As such, the output PW of the generator 29 detected by the output gauge 72 can be used as the second parameter.

The total flow volume Gf of the fuel F supplied to the combustor 31 from the multiple fuel systems can be detected by a flow volume gauge 78 provided in the fuel line 60 before branching into the multiple fuel systems. The total flow volume Gf of the fuel F supplied to the combustor 31 from the multiple fuel systems can also be detected from a valve lift of a flow volume adjustment valve 79 for the fuel flowing in the fuel line 60. Accordingly, the flow volume of the fuel detected by the flow volume gauge 78 provided in the fuel line 60 or the flow volume of the fuel specified by a valve lift command value of the flow volume adjustment valve 79 can be used as the second parameter.

Although the flow volume of the air A taken in by the compressor 11 can be detected directly with a flow volume gauge, only a few plants are provided with such a flow volume gauge. As such, for example, a relationship between a mass flow volume Ga of the air A taken in by the compressor 11, the IGV opening, and the intake temperature may be found in advance, and that relationship may then be used to determine the mass flow volume Ga of the air A taken in by the compressor 11 from the IGV opening specified by the IGV opening command value and the intake temperature detected by the intake temperature gauge 73. Note that in this case, the mass flow volume Ga of the air A taken in by the compressor 11 is a mass flow volume when the generator 29 connected to the gas turbine 10 is connected to a power system and the RPMs of the generator 29 and the gas turbine 10 correspond to a system frequency.

The combustion state of the fuel within the combustion liner 33 of the combustor 31 can be expressed by the total flow volume of the fuel supplied to the combustor 31 and the flow volume of the air supplied to the combustor 31, or in other words, the flow volume of the air taken in by the compressor 11. Accordingly, the total flow volume of the fuel supplied to the combustor 31 can be used as the first parameter and the flow volume of the air taken in by the compressor 11 can be used as the second parameter. Thus, as described earlier, the flow volume of the fuel detected by the flow volume gauge 78 provided in the fuel line 60 or the flow volume of the fuel specified by a valve lift command value of the flow volume adjustment valve 79 can be used as the first parameter, and the flow volume of the air taken in by the compressor 11 determined through the method described earlier can be used as the second parameter.

Figure 18:
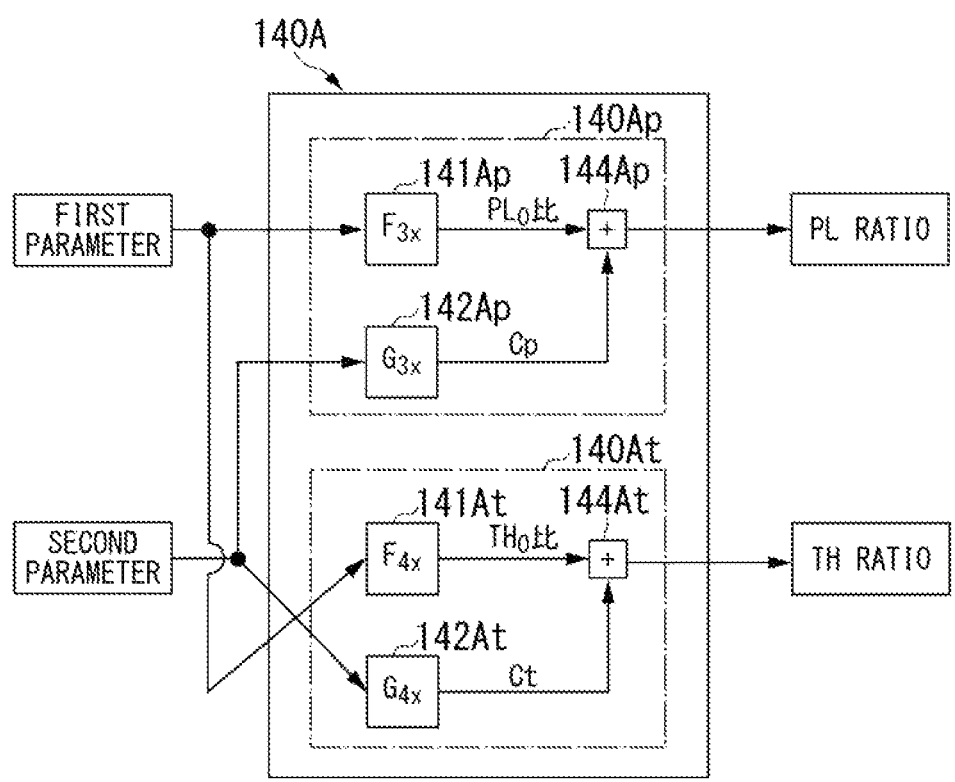
FIG. 18 is a function block diagram illustrating a flow volume ratio calculation device according to a variation on the embodiment of the present invention.

As illustrated in FIG. 18, a flow volume ratio calculation device 141A according to the present variation includes: a pilot ratio calculator 140Ap that receives the values of the first parameter and the second parameter, examples of which have been given above, and calculates the PL ratio; and a top hat ratio calculator 140At that receives the values of the first parameter and the second parameter, examples of which have been given above, and calculates the TH ratio.

The pilot ratio calculator 140Ap includes a $PL_0$ ratio computer (flow volume ratio computer) 141Ap that determines the $PL_0$ ratio in accordance with the value of the first parameter, a correction value computer 142Ap that calculates the correction value Cp in accordance with the value of the second parameter, and a corrector 144Ap that corrects the $PL_0$ ratio with the correction value Cp. Like the $PL_0$ ratio computer 141p according to the embodiment described above, the $PL_0$ ratio computer 141Ap has a function defining a relationship between the first parameter and the $PL_0$ ratio. Additionally, like the correction value computer 142p according to the embodiment described above, the correction value computer 142Ap has a function defining a relationship between the second parameter and the correction value Cp.

The top hat ratio calculator 140At includes a $TH_0$ ratio computer (flow volume ratio computer) 141At that determines the $TH_0$ ratio in accordance with the value of the first parameter, a correction value computer 142At that calculates the correction value Ct in accordance with the value of the second parameter, and a corrector 144At that corrects the $TH_0$ ratio with the correction value Ct. Like the $TH_0$ ratio computer 141t according to the embodiment described above, the $TH_0$ ratio computer 141At has a function defining a relationship between the first parameter and the $TH_0$ ratio. Additionally, like the correction value computer 142t according to the embodiment described above, the correction value computer 142At has a function defining a relationship between the second parameter and the correction value Ct.

Note that basically the same effects as those of the embodiment described above can be obtained even if the flow volume ratio calculation device 140 of the control device 100 in the embodiment described above is replaced with the flow volume ratio calculation device 140A described above.

INDUSTRIAL APPLICABILITY

According to an aspect of the present invention, the combustion stability of fuel within a combustor can be improved.

REFERENCE SIGNS LIST

10 Gas turbine
11 Compressor
14 IGV
21 Turbine
31 Combustor
33 Combustion liner (or transition piece)
43 Pilot burner
44 Pilot nozzle
51 Top hat nozzle
53 Main burner
54 Main nozzle
60 Fuel line
61 Pilot fuel line
62 Main fuel line
63 Top hat fuel line
65 Pilot fuel valve
66 Main fuel valve
67 Top hat fuel valve
71 RPM gauge
72 Output gauge
73 Intake temperature gauge
74 Intake pressure gauge
75 Blade path temperature gauge
76 Exhaust gas temperature gauge
100 Control device
110 Combustion load command generator
120 Load factor computer
130 Fuel flow volume command generator (total flow volume computer)
140, 140A Flow volume ratio calculation device (flow volume ratio calculator)
140p, 140Ap Pilot ratio calculator
141p, 141Ap $PL_0$ ratio computer (flow volume ratio computer)
142p, 142Ap Correction value computer
144p, 144Ap Corrector
140t, 140At Top hat ratio calculator
141t, 141At $TH_0$ ratio computer (flow volume ratio computer)
142t, 142At Correction value computer
144t, 144At Corrector
160 System flow volume computer
170 Valve controller
180 Interface

The invention claimed is:

1. A flow volume ratio calculation device configured to calculate a flow volume ratio of fuels flowing in multiple fuel systems in a gas turbine including the multiple fuel systems, a compressor that compresses air to generate compressed air, a combustor that combusts the fuels from the multiple fuel systems in the compressed air to generate combustion gas, and a turbine that is driven by the combustion gas, the flow volume ratio calculation device comprising:

a first calculator having a first at least one computer that receives values of two parameters capable of expressing a combustion state in the combustor and that calculates, from a first predetermined relationship between the two parameters and the flow volume ratio, the flow volume ratio relative to the values of the two parameters received by the at least one computer,
wherein the two parameters are a first parameter and a second parameter,
wherein the first parameter is an inlet temperature-correlated value that is a value that changes in correlation with a change in an inlet temperature of the combustion gas in the turbine, and is calculated based on a first output of a generator connected to the gas turbine when the inlet temperature is a first temperature, a second output of the generator when the inlet temperature is a second temperature, and a measured value of an output of the generator when the inlet temperature is a third temperature, wherein the second temperature is greater than the first temperature, the third temperature is greater than or equal to the first temperature and is less than or equal to the second temperature, the second output is greater than the first output, and the measured value of the output of the generator is greater than or equal to the first output and is less than or equal to the second output,
wherein the second parameter is based on a set of values and is a flow velocity-correlated value that changes in correlation with a change in a flow velocity of the combustion gas within the combustor, and is a calculated load factor at an operation time of the gas turbine that is a percentage of a current load relative to a maximum load permitted in the gas turbine, wherein the current load is the measured value of the output of the generator and the maximum load is calculated based on an intake pressure of the air taken in by the compressor and an intake temperature of the air taken in by the compressor,
wherein the first parameter is determined based on another set of values which include at least one value that is different from the set of values which the second parameter is determined based on and is also different from a value specifying a total fuel flow volume supplied to the combustor, wherein the first calculator is constituted by:
a second calculator having a second at least one computer that receives the value of the first parameter, and that calculates, from the value of the first parameter, a first ratio included in the flow volume ratio as a ratio of a fuel flow supplied to the combustor through a first fuel system among the multiple fuel systems with respect to the total fuel flow volume supplied to the combustor through the multiple fuel systems; and
a third calculator having a third at least one computer that receives the value of the first parameter, and that calculates, from the value of the first parameter, a second ratio included in the flow volume ratio as a ratio of a fuel flow supplied to the combustor through a second fuel system among the multiple fuel systems with respect to the total fuel flow volume supplied to the combustor through the multiple fuel systems,
wherein at least one of the second calculator and the third calculator is configured to calculate a correction value applied to the first ratio or the second ratio that is calculated by the one of the second calculator and the third calculator in accordance with the second parameter, and to correct the first ratio or the second ratio with the correction value, and
wherein the flow volume ratio calculation device is configured to output the first ratio or the second ratio with the correction value such that fuel flows via the multiple fuel systems according to the first ratio or the second ratio with the correction value.

2. The flow volume ratio calculation device according to claim 1, wherein each of the second calculator and the third calculator that constitute the first calculator includes:
a respective flow volume ratio computer that determines, from a second predetermined relationship between the first parameter and the first ratio or the second ratio, the first ratio or the second ratio relative to the value of the first parameter of the two parameters as received;
the one of the second calculator and the third calculator includes a correction value computer that determines, from a third predetermined relationship between the second parameter and the correction value for the first ratio or the second ratio, the correction value for the first ratio or the second ratio which is calculated by the one of the second calculator and the third calculator in accordance with the value of the second parameter of the two parameters as received; and a corrector that corrects the first ratio or the second ratio determined by the flow volume ratio computer with the correction value determined by the correction value computer.

3. The flow volume ratio calculation device according to claim 2, wherein
the predetermined relationship used by the correction value computer is a relationship between the second parameter and the first ratio or the second ratio when the first parameter is constant.

4. The flow volume ratio calculation device according to claim 1, wherein
the combustor includes a first burner that subjects a first fuel to diffusion combustion and a second burner that subjects a second fuel to premixed combustion; and
the gas turbine includes, as the multiple fuel systems, the first fuel system that supplies a third fuel to the first burner and a third fuel system that supplies a fourth fuel to the second burner.

5. The flow volume ratio calculation device according to claim 1, wherein
the combustor includes a burner that sprays a fuel;
the gas turbine includes, as the multiple fuel systems, a burner system that supplies a fuel to the burner, and an upstream supply system that supplies another fuel into the compressed air delivered to the burner;
the burner system includes the first fuel system;
the upstream supply system includes the second fuel system; and
the flow volume ratio includes a ratio of a flow volume of the fuel supplied to the combustor from the burner system to the total fuel flow volume supplied to the combustor from the multiple fuel systems.

6. A control device comprising:
the flow volume ratio calculation device according to claim 1;
a total flow volume computer that determines the total flow volume of the fuels supplied to the combustor from the multiple fuel systems;
a system flow volume computer that determines a fuel flow volume in each fuel system of the multiple fuel systems from the total flow volume determined by the total flow volume computer and the flow volume ratio calculated by the flow volume ratio calculation device; and
a valve controller having at least one valve computer, wherein a control signal is output to a fuel flow volume adjustment valve provided in each fuel system of the multiple fuel systems so that the fuel flow volume in each fuel system of the multiple fuel systems becomes the corresponding fuel flow volume determined by the system flow volume computer.

7. A gas turbine plant comprising:
the control device according to claim 6; and
the gas turbine.

8. The flow volume ratio calculation device according to claim 1,
wherein the first ratio or a corrected first ratio that is the first ratio corrected by the correction value is output from the flow volume ratio calculation device,
a fuel flow volume supplied to the combustor through the first fuel system is calculated by multiplying the total fuel flow volume supplied to the combustor by the first ratio or the corrected first ratio output from the flow volume ratio calculation device,
the second ratio or a corrected second ratio that is the second ratio corrected by the correction value is output from the flow volume ratio calculation device, and
a fuel flow volume supplied to the combustor through the second fuel system is calculated by multiplying the total fuel flow volume supplied to the combustor by the second ratio or the corrected second ratio output from the flow volume ratio calculation device.

* * * * *